(12) United States Patent
Rajagopalan et al.

(10) Patent No.: US 12,299,435 B2
(45) Date of Patent: May 13, 2025

(54) SYSTEM AND METHOD FOR OPTIMALLY ASSEMBLING APPLICATION MODERNIZATION SOLUTIONS

(71) Applicant: COGNIZANT TECHNOLOGY SOLUTIONS INDIA PVT. LTD., Chennai (IN)

(72) Inventors: Madhu Rajagopalan, Chennai (IN); Surendranathan Ardhanari, Chennai (IN); Senthilkumar Chinnusamy, Coimbatore (IN); Trichur Krishnan Narayanan, Chennai (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 170 days.

(21) Appl. No.: 18/206,130

(22) Filed: Jun. 6, 2023

(65) Prior Publication Data
US 2024/0281238 A1  Aug. 22, 2024

(30) Foreign Application Priority Data
Feb. 20, 2023  (IN) .............................. 202341011442

(51) Int. Cl.
G06F 9/44 (2018.01)
G06F 8/65 (2018.01)
G06F 9/451 (2018.01)

(52) U.S. Cl.
CPC ............... *G06F 8/65* (2013.01); *G06F 9/451* (2018.02)

(58) Field of Classification Search
CPC ....... G06F 3/011; G06T 2200/24; G06T 7/73; G06V 10/945; G09G 2350/00; G09G 5/395; G09G 5/393; Y10S 715/972
See application file for complete search history.

(56) References Cited

U.S. PATENT DOCUMENTS

| 10,496,935 B2 | 12/2019 | Sachdev et al. |
| 2011/0280447 A1* | 11/2011 | Conwell ............. G06F 16/9535 382/103 |
| 2024/0394966 A1* | 11/2024 | Mizuta ................... G06F 3/012 |

OTHER PUBLICATIONS

IBM, "Accelerate the modernization of your information architecture with expert tools and advice," Jun. 28, 2021 (https://www.ibm.com/blogs/journey-to-ai/2021/06/accelerate-the-modernization-of-your-information-architecture-with-expert-tools-and-advice/).

(Continued)

*Primary Examiner* — Chuck O Kendall
(74) *Attorney, Agent, or Firm* — Troutman Pepper Locke LLP

(57) ABSTRACT

A system and a method for optimally assembling application modernization solutions is provided. One or more direct inputs or indirect inputs relating to application modernization solution determination are received as a query to identify and analyze one or more parameters associated with the inputs. Application modernization solutions are determined based on the analyzed parameters by applying a pattern recognition technique. Proximity and similarity of the parameters is assessed with the determined application modernization solutions by applying a nearest search technique. Lastly, the application modernization solutions are assembled for generating one or more catalogue application modernization solutions.

33 Claims, 25 Drawing Sheets

(56) References Cited

OTHER PUBLICATIONS

Advanced, Modern Systems, "Automated Assembler Refactoring," 2021 (https://modernsystems.oneadvanced.com/en/services/assembler/).
Amazon Web Services, ClearScale, "Application Modernization Accelerator," 2021 (https://aws.amazon.com/marketplace/pp/prodview-mv2pmhr5iw4ge).
Micro Focus, "Accelerate Your Application Delivery," 2021 (https://www.microfocus.com/en-us/solutions/accelerate-application-delivery).

* cited by examiner

| LOGO | MENU 1 | MENU 2 | MENU 3 | USER PROFILES |

Breadcrumb comes here> You are here

| Visual Basic to Tech B   × Q |  ⇦ Search understands abbreviations VB & Visual Basic are equivalent terms |   VB to Tech B   × Q |

Your saved Searches
- Saved Search 1
- Saved Search 2
- Saved Search 3

Similar Searches
- Similar Search 1
- Similar Search 2
- Similar Search 3

Search Results (6 Results Found)

Migration from Visual Basic to Technology B
The Modernization Acceleration Kit Outlines the migration of Technology A to Technology B with the details of Migration Planning, Assessment, Migration Approach, Estimation and tool analysis.
| App Migration | Tech Migration | Visual Basic | Technology B |
☆☆☆☆☆ 5 ⟷ 4532  Match : 95%

Technology B Upgrade
This MAK contains step-by-step instructions to migrate Technology B version from version 1 to version 2 and is achieved using Tool B.
| Tech Upgrade | Technology B |
☆☆☆☆☆ 4 ⟷ 76  25  Match : 95%

Automated Rewrite from Tech- A to Tech- D using Tool C
MAK is about conversion of Technology A file to Technology D databases in direct model, which helps the application to move to modernization world
| Rewrite | Technology A | Tool C |
☆☆☆☆☆ 3 ⟷ 34  32  Match : 60%

FIG. 2A

| LOGO | MENU 1 | MENU 2 | MENU 3 | USER PROFILES |

Breadcrumb comes here> You are here

Migration using Tool C (or) Migration from tech A    x 🔍

Search Results (6 Results Found)

App Migration from Technology A to Technology B
The Modernization Acceleration Kit Outlines the migration of Technology A to Technology B with the details of Migration Planning, Assessment, Migration Approach, Estimation and tool analysis.
[App Migration] [Tool C] [Technology A] [Technology B]
☆☆☆☆☆ 5  💬 45    Match : 95%

Automated Rewrite from Tech- A to Tech- D using Tool C
MAK is about conversion of Technology A file to Technology D databases in direct model, which helps the application to move to modernization world
[Rewrite] [Technology A] [Tool C]
☆☆☆☆☆ 3  💬 32    Match : 60%

Automated Rewrite from Tech- B to Tech- A using Tool C
MAK is about conversion of Technology A file to Technology D databases in direct model, which helps the application to move to modernization world
[Rewrite] [Technology B]
☆☆☆☆☆ 3  💬 32    Match : 60%

Your Saved Searches
- Saved Search 1
- Saved Search 2
- Saved Search 3

Similar Searches
- Similar Search 1
- Similar Search 2
- Similar Search 3

FIG. 2C

Home> My Projects > Solution Modeler for 10000325404-ADM One Modernize Product Team > Catalog Solution Catalog Solution | VSAM to DB2 | X 🔍

Search Results    56 results found

MAP_Database_Migration_VSAM to DB2 [Customized] [Matches 70%]
This MAK details the manual steps involved in VSAM to DB2 migration. VSAM or Virtual Sequential Access Method, is a file access methodology or indexing or sequencing of records on direct access devices. DB2 is a database management system (DBMS). A DBMS is a software package designated to create, store and manage databases. This document details out of the systematic approach taken to migrate data to DB2 by maintaining security and data integrity.

[Cloud Migration] [VSAM] [DB2] [AWS]
⭐⭐⭐⭐⭐ ⇐ 2 ⇔ 2

MAP_Database_Migration_VSAM to DB2 [Customized] [Matches 70%]
MAK is about conversion of VSAM file to DB2 databases in direct model, which helps the application to move to modernization world. DB2 is very large databases, high transactions rate on multiple platforms so it's a better choice than VSAM in most situations as part of business. Uniquely, the CICS VT solution means that we do not have to change any of our existing application programs, but our data is still migrated to DB2. Because we don't change the programs, so the migration costs are reduced and most importantly risk is substantially reduced.

[Legacy Modernization] [VSAM] [DB2] [AWS]
⭐⭐⭐⭐⭐ ⇐ 2 ⇔ 2

FIG. 3A

Home> My Projects > Solution Modeler for 10000325404-ADM One Modernize Product Team > Catalog Solution Catalog Solution | Angular Version Upgrade | ✕ 🔍

Search Results    109 results found

---

MAP_Programming Language_Upgrade_Java to Java    [Customized]    [Matches 100%]

MAK guides you through a high-level journey of migrating monolithic Java platform to a refactored Microservices Java platform. It covers only the Service layer whereas UI and DB layers are untouched.

Technology Upgrade | Angular | Java | SAML | AWS

⭐⭐⭐⭐⭐ 💬 2  ⬇ 1

---

MAP_Framework_Upgrade_ Angualar to Angular    [Matches 85%]

Modernization Acceleration Kit or MAK provides a detailed and complete process if we choose to upgrade from angular 4 to angular 10.1.5 through code refactoring.

Technology Upgrade | Angular | Cloud

⭐⭐⭐⭐⭐ 💬 3  ⬇ 2

---

MAP_Framework_Upgrade_Angualar to Angular    [Matches 85%]

Modernization Acceleration Kit (MAK) outlines the Angular upgrade with the details of the Migration Approach and Estimation.

Technology Upgrade | Angular

Catalog Solution | Visual Basic to .NET migration | X Q

Search Results  207 results found

MAP_Programming Language_Migration_Visual Basic to .NET — Matches 85%
This modernization Acceleration Kit (MAK) outlines the migration of Visual Basic 6.0 platform to ASP.NET MVC platform Technology Migration | .NET | Visual Basic
⭐⭐⭐⭐⭐ 💬 3  👍 1

MAP_Framework_Migration_.NET to .NET Core — Matches 85%
The MAK outlines the procedure for upgrading ASP.NET to Dot NET Core the details of upgrade approach, analyses, estimation and importing namespace required to upgrade across the application.

Technology Migration | .NET | Visual Basic
⭐⭐⭐⭐⭐ 💬 1  👍 1

MAP_ Programming Language_Migration_ASP to C# .NET — Matches 85%
The modernization Acceleration Kit or MAK outlines the upgradation of the .NET application from the lower C# version to a higher C# version Cloud Migration | ASP | C# .NET | AIX(PPC64) | IBM Infosphere MDM | Windows
⭐⭐⭐⭐⭐ 💬 6  👍 3

FIG. 4A

MAP_Framework_Upgrade_Apache CXF to Apache CXF  [Customized]  [Matches 70%]
This modernization Acceleration Kit (MAK) outlines the migration of Apache CXF framework to spring boot framework with the details of the Migration Approach, Estimation, Planning, Analysis & Coding.

[Technology Upgrade]   [Visual Basic]   [Apache CXF]

☆☆☆☆☆  ♡ 1   ↓ 1

---

MAP_Database_Upgrade_SQL Server to SQL Server  [Customized]  [Matches 70%]
This MAK contains step-by-step instructions to migrate SQL Server version from 2008 R2 to 2016. DMA (Data Migration Assistant) Tool helps to identify the deprecated features of SQL Server 2016 version and provides recommendations for it.

[Technology Upgrade]   [C.NET]   [SQL server]   [AWS]

☆☆☆☆☆  ♡ 5   ↓ 1

---

MAP_Database_Upgrade_SQL Server to SQL Server  [Customized]  [Matches 70%]
This MAK contains step-by-step instructions to migrate SQL server version from 2008 R2 to 2016. The DMA (Data Migration Assistant) Too helps to identify the deprecated features of SQL Server 2008 R2 in SQL Server 2016 Version and provides recommendations for it.

[Technology Upgrade]   [C#.NET]   [SQL Server]   [Internet Explorer]   [Google Chrome]

Home> My Projects > Solution Modeler for 10000325404-ADM OneModernize Product Team > Catalog Solution Catalog Solution | Mainframe Application Decommissioning X 🔍 | Save this search | View catalog Search Results    129 results found My Saved Searches Similar Searches Mainframe Application Decommissioning MAP_ Operating System_Migration_Mainframe to Mainframe   Matches 70%
This Modernization Acceleration Kit or MAK outlines the efficient way to setup mainframe test environment with the details of the approach, estimation, planning, assessment, analysis, and code remediation.

Legacy Modernization | Mainframe
☆☆☆☆☆ 💬 2 👍 1

MAP Programming Language_Migration_ COBOL to COBOL   Customized   Matches 70%
IBM Enterprise COBOL is one of the most used application programming languages across mainframe clients. With new releases and upgrades in COBOL, the mainframe clients need to keep up with recent versions so to ensure support availability and leverage the benefits of newer versions Legacy Modernization | Mainframe | COBOL | VSAM | DB2 Connect | DB2

FIG. 6

Catalog Solution                    MF Files Cloud migration        X 🔍   Save this search              View catalog Search Results      201 results found
The below results are partially matched, refine your search or select dynamic solution for better result MAP_ programming language_ Migration_ C#.NET    [Customized]    [Matches 50%]
This Modernization Acceleration Kit or MAK outlines the upgradation of the .NET application from the lower C# version

[Legacy Modernization]  [IBM Zcloud]  [C#.NET]  [Visual Basic]  [Mainframe]  [Dataset]  [IBM Infosphere MDM]  [AWS]

⭐ 6  👍 2                                                                                     ♡

MAP Programming Language_Migration_ C#.NET to C#NET    [Customized]    [Matches 50%]
This Modernization Acceleration Kit or MAK outlines the upgradation of the .NET application from the lower C# version to the higher C# Version.

[Cloud Migration]  [C#.NET]  [Internet Explorer]  [Windows Server -64 bit]  [DB2 connect]  [Google Chrome]

⭐ 1  👍 1                                                                                     ♡

[My Saved Searches]

[Similar Searches]
[MF files cloud migration]

FIG. 8

① Service Offering    ② Source and target technology stack    ③ Solution Summary ⦿ Programming language  ○ Operating System  ○ Database  ○ Middleware  ○ Deployment  ○ Others What is the programming language you are looking for?
These fields are mandatory* to get your right solution. If the technology is not available in the lists? Reach out
CognizantMAP@cognizant.com Choose your source programming language
[Mule 3.0]

⇨

Choose your target programming source
[Mule 4.2]

Is your application Monolithic?*
○ Yes  ○ No

Would you like to enable Microservices Architecture?
○ Yes  ○ No

Is your application Web Based?*
○ Yes  ○ No

Choose your source browser?
[Type and select]

Choose your target browser?
[Type and select]
Only compatible technology are allowed to select Recommendation(s) - 1    ☐ Platform recommended    ☐ Other similar solutions Mule 3.x to 4.x
upgrade
[Mule > Mule]
Matches~100%

OPERATING SYSTEM    EXIT

FIG. 9B

SYSTEM AND METHOD FOR OPTIMALLY ASSEMBLING APPLICATION MODERNIZATION SOLUTIONS

This application claims the benefit of India Application No. 202341011442, filed Feb. 20, 2023, which is herein incorporated by reference.

FIELD

The present invention relates generally to the field of application modernization. More particularly, the present invention relates to a system and a method for optimally assembling solutions generated for modernization of applications.

BACKGROUND

Modernization of computing applications is generally carried out by various organizations for increasing and accelerating work environment efficiency and robustness. Modernization of computing applications is generally carried out by generating and executing one or more application modernization solutions for updating application or technology being used by the organization to latest versions or another efficient application or technology. However, the existing techniques used for generating and assembling solutions for application modernization are not effective and utilizes non-comprehensive approach for solution generation and assembly.

Typically, existing application modernization solution generation techniques require consultation with multiple Subject Matter Experts (SMEs) to provide modernization solutions for every modernization task. Further, existing techniques are not able to adequately provide accumulated form of the generated application modernization solution to users. Also, a unified view of the generated application modernization solution is generally not available. Further, users may require application modernization solutions based on a single technology or multiple technologies and the existing techniques do not render relevant and matching application modernization solutions adequately. Furthermore, there may be multiple permutations and combinations for rendering application modernization solutions, the existing techniques are not able to provide optimal assembly of application modernization solution with respect to user's needs and requirements. Furthermore, existing techniques are not able to render historical solutions which the user may refer, thus resulting in extended time and resources for every application modernization solution search. Yet further, users may use pre-assembled (historical) application modernization solutions and the existing techniques do not provide information on the latest versions of the technologies used in the pre-assembled application modernization solutions, and therefore users may end-up implementing obsolete application modernization solutions.

In light of the aforementioned drawbacks, there is a need for a system and a method which provides for optimally assembling solutions generated for modernization of applications. There is a need for a system and a method which eliminates dependency on SMEs for assembling application modernization solution. There is a need for a system and a method which provides for an accumulated and unified view of the generated application modernization solutions. Further, there is a need for a system and a method which provides for suitably rendering assembled application modernization solutions which are most appropriate. Furthermore, there is a need for a system and a method which provides for assembling application modernization solutions with respect to user's needs and requirements. Yet further, there is a need for a system and a method which provides for adequately rendering historically used application modernization solutions along with latest versions of technologies used.

SUMMARY

In various embodiments of the present invention, a system for optimally assembling application modernization solutions is provided. The system comprises a memory storing program instructions, a processor configured to execute instructions stored in the memory and a solution assembling engine executed by the processor. The solution assembling engine is configured to receive one or more direct inputs or indirect inputs relating to application modernization solution determination as a query to identify and analyze one or more parameters associated with the inputs. The solution assembling engine is configured to determine application modernization solutions based on the analyzed parameters by applying a pattern recognition technique. Further, the solution assembling engine is configured to assess proximity and similarity of the parameters with the determined application modernization solutions by applying a nearest search technique. A technology composition equivalence is assessed between the parameters and the determined application modernization solutions. Further, the solution assembling engine is configured to assemble the application modernization solutions for generating one or more catalogue application modernization solutions.

In various embodiments of the present invention, a method for optimally assembling application modernization solutions is provided. The method is implemented by a processor executing program instructions stored in a memory. The method comprises receiving one or more direct inputs or one or more indirect inputs relating to application modernization solution determination as a query to identify and analyze one or more parameters associated with the inputs. Further, the method comprises determining application modernization solutions based on the analyzed parameters by applying a pattern recognition technique. Further, the method comprises assessing proximity and similarity of the parameters with the determined application modernization solution by applying a nearest search technique. A technology composition equivalence is assessed between the parameters and the determined application modernization solutions. Further, the method comprises assembling the application modernization solutions for generating one or more catalogue application modernization solutions.

In various embodiments of the present invention, a computer program product comprising a non-transitory computer-readable medium having computer program code stored thereon, the computer-readable program code comprising instructions that, when executed by a processor, causes the processor to receive one or more direct inputs or one or more indirect inputs relating to application modernization solution determination as a query to identify and analyze one or more parameters associated with the inputs. Further, application modernization solutions are determined based on the analyzed parameters by applying a pattern recognition technique. Further, proximity and similarity of the parameters is assessed with the determined application modernization solutions by applying a nearest search technique. A technology composition equivalence is assessed between the parameters and the determined application modernization solutions. Further, the application modernization solutions are assembled for generating one or more catalogue application modernization solutions.

BRIEF DESCRIPTION OF THE ACCOMPANYING DRAWINGS

The present invention is described by way of embodiments illustrated in the accompanying drawings wherein:

FIGS. 2A to 2C illustrate screenshots of a Graphical User Interface (GUI) depicting searching for application modernization solutions using one or more parameters, in accordance with an embodiment of the present invention;

FIGS. 3A and 3C illustrate screenshots of the GUI depicting one or more catalogue solutions for the assembled application modernization solutions;

FIGS. 4A to 4D illustrate screenshots of the GUI depicting prioritized solutions such that the most effective solution is provided at the top via the GUI and the least effective solution is provided at the bottom via the GUI based on a match percentage, in accordance with an embodiment of the present invention;

FIGS. 6 and 7 illustrate screenshots of the GUI depicting a recommended match percentage for the keywords present in the direct inputs and the indirect inputs and provided in the catalog solution rendered via the GUI, in accordance with an embodiment of the present invention;

FIG. 8 illustrates a screenshot of the GUI depicting catalogue solutions with a weak match percentage for the keywords present in the direct inputs and the indirect inputs, in accordance with an embodiment of the present invention;

FIGS. 9B and 9C illustrate screenshots of the GUI depicting the customized MAK for a guided search, in accordance with an embodiment of the present invention;

DETAILED DESCRIPTION

The present invention discloses a system and a method which provides for optimally assembling solutions generated for modernization of applications. The present invention provides for a system and a method which provides for an accumulated and unified view of the generated application modernization solutions by rendering unique combinations of all assembled application modernization solutions along with solution summaries that have been previously used. The present invention provides for reducing dependency on SMEs for assembling application modernization solutions. Further, the present invention provides for rendering the application modernization solutions that match with user requirements by using result of user's project technology stack. Furthermore, the matching application modernization solutions are filtered and prioritized based on analyzing technology composition, and project proximity influencers. Furthermore, the present invention provides for adequately rendering historically used application modernization solutions along with the latest versions of the technologies used based on ranking of latest generated and assembled application modernization solutions with respect to older application modernization solutions.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the scope of the invention. The terminology and phraseology used herein is for the purpose of describing exemplary embodiments and should not be considered limiting. Thus, the present invention is to be accorded the widest scope encompassing numerous alternatives, modifications, and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

Figure 1:
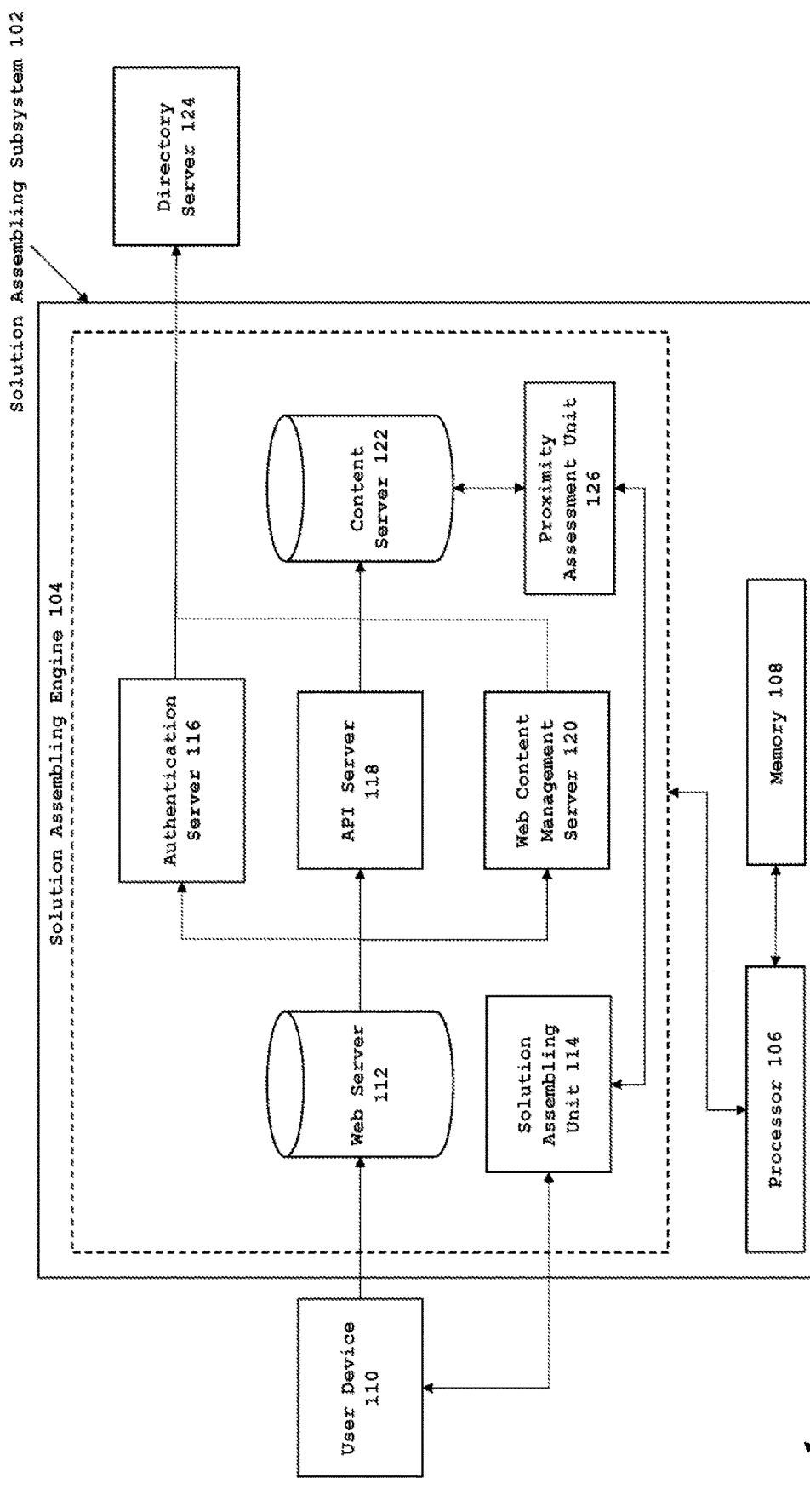
FIG. 1 is a detailed block diagram of a system for optimally assembling solutions generated for modernization of applications, in accordance with an embodiment of the present invention.

FIG. 1 is a detailed block diagram of a system 100 for optimally assembling solutions generated for modernization of applications, in accordance with various embodiments of the present invention. Referring to FIG. 1, in an embodiment of the present invention, the system 100 comprises a solution assembling subsystem 102, a user device 110 and a directory server 124. The user device 110 and the directory server 124 are connected to the subsystem 102 via a communication channel (not shown). The communication channel (not shown) may include, but is not limited to, a physical transmission medium, such as, a wire, or a logical connection over a multiplexed medium, such as, a radio channel in telecommunications and computer networking. The examples of radio channel in telecommunications and computer networking may include, but are not limited to, a local area network (LAN), a metropolitan area network (MAN) and a wide area network (WAN).

In an embodiment of the present invention, the subsystem 102 is configured with a built-in-mechanism for automatically and optimally assembling solutions generated for modernization of applications. The subsystem 102 is capable of being operated as a stand-alone entity. The subsystem 102 is a self-optimizing and an open architecture system. The subsystem 102 provides a Catalog Solution Assembler (CSA) system which aids users to identify the most relevant application modernization solution without having to go through a step-by-step approach by dynamically assembling the application modernization solutions and quickly providing assembled application modernization solutions. Further, the application modernization solutions provided on a GUI are pre-assembled.

In another embodiment of the present invention, the subsystem 102 may be implemented in a cloud computing architecture (e.g., azure cloud) in which data, applications, services, and other resources are stored and delivered through shared data-centers. In an exemplary embodiment of the present invention, the functionalities of the subsystem 102 are delivered to a user as Software as a Service (SaaS) or a Platform as a Service (PaaS) over a communication network.

In another embodiment of the present invention, the subsystem 102 may be implemented as a client-server architecture. In this embodiment of the present invention, a client terminal accesses a server hosting the subsystem 102 over a communication network. The client terminals may include but are not limited to a computer, a tablet, or any other wired or wireless terminal. The server may be a centralized or a decentralized server.

In an embodiment of the present invention, the subsystem 102 comprises a solution assembling engine 104 (the engine 104), a processor 106 and a memory 108. The engine 104 is a rule-based engine and assembles the application modernization solution in a contextual manner. The engine 104 processes one or more parameters for optimally assembling solutions generated for modernization of applications, as described later in the specification. Further, the parameters aid in shortlisting and prioritizing the solutions that are ideal for the users. In various embodiments of the present invention, the engine 104 has multiple units, which work in conjunction with each other for providing assembled solutions generated for modernization of applications. The various units of the engine 104 are operated via the processor 106 specifically programmed to execute instructions stored in the memory 108 for executing respective functionalities of the units of the engine 104, in accordance with various embodiments of the present invention. In an exemplary embodiment of the present invention, the engine 104 operates on a Red Hat Enterprise Linux (RHEL) 7 technique.

In an embodiment of the present invention, the engine 104 comprises a web server 112, a solution assembling unit 114, an authentication server 116, an Application Programming Interface (API) server 118, a web content management server 120, a content server 122 and a proximity assessment unit 126.

Figure 2B:
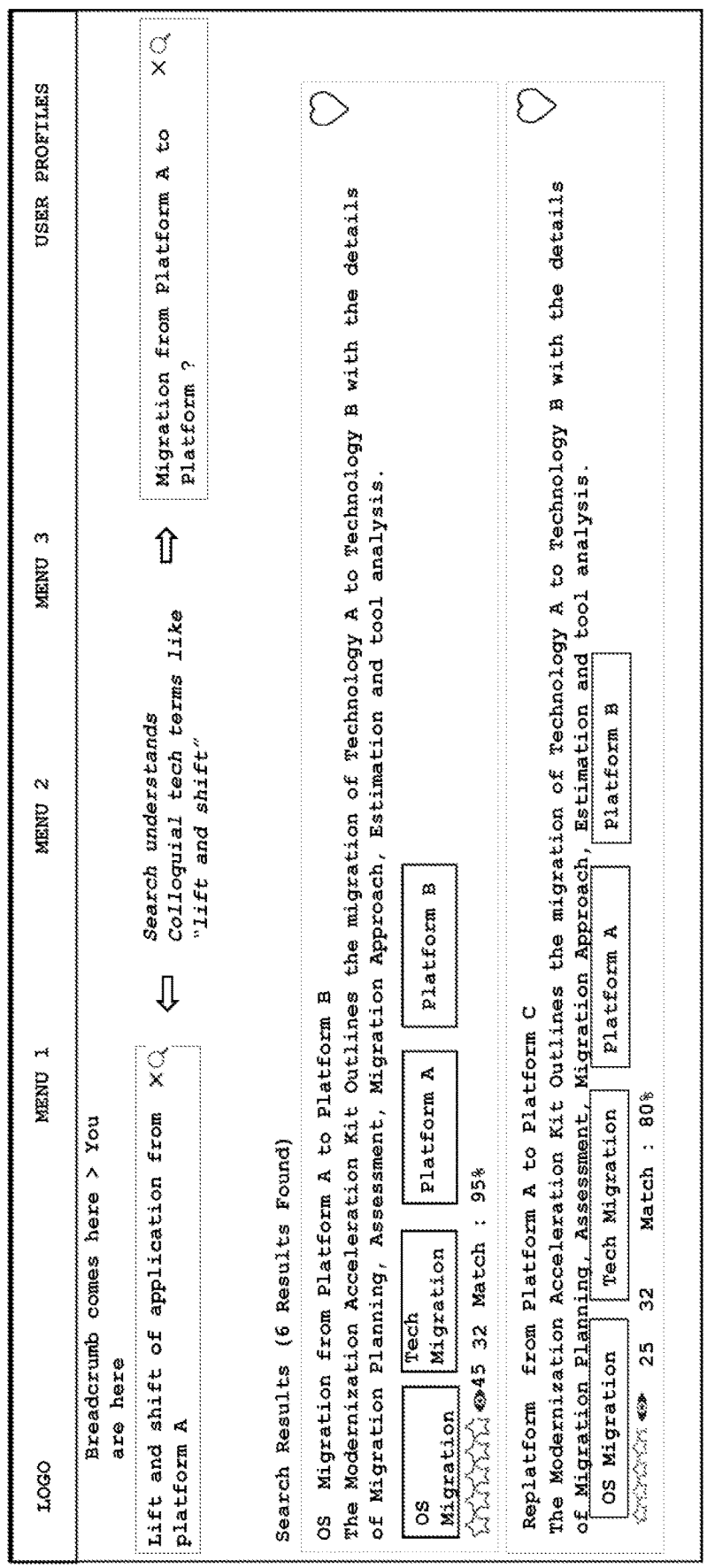

In operation, in an embodiment of the present invention, one or more inputs are received via the user device 110 relating to application modernization solution determination. The inputs are received via a dynamic GUI rendered via the user device 110. In an exemplary embodiment of the present invention, the inputs received comprise direct inputs and indirect inputs. The direct inputs include inputs received from one or more users via the GUI. The indirect inputs include context-based inputs, which are automatically filled by contextual intelligence embedded in the GUI in the event, direct inputs are not provided by the users. In an exemplary embodiment of the present invention, the user device 110 includes a computer, a laptop, or the like, which is capable of rendering the GUI. In an embodiment of the present invention, the application modernization solution determination relates to modernizing one or more existing technology types such as, but are not limited to, database modernization, programming language modernization, Operating System (OS) modernization, and middleware modernization. Therefore, a source technology is modernized/migrated to a target technology using the application modernization solution. For example, database modernization includes modernizing or migrating from VSAM (the source technology name) to Oracle® (the target technology name). Programming language modernization may include modernizing or migrating from COBOL® (the source technology name) to Java 1.11® (the target technology name). In an embodiment of the present invention, the inputs are associated with parameters relating to application modernization solution determination. In an exemplary embodiment of the present invention, the one or more parameters may include, but are not limited to, names of technology type (source technology name and target technology name), application modernization solution description, tool names used in application modernization or solutions referring to tool names, synonyms relating to technology type names, keywords relating to application modernization solution, solution descriptors relating to application modernization, application modernization technology data, application modernization proximity influence data, equivalent solutions (e.g. application modernization composition required by users), latest application modernization solutions and name of pre-stored Modernization Acceleration Kit (MAK) associated with the previously modernized applications, as illustrated in FIGS. 2A to 2C. The inputs provided are in the form of a query. In an exemplary embodiment of the present invention, the inputs are provided at least manually or using a chatbot provided via the GUI.

In an embodiment of the present invention, the input received via the user device 110 is sent to the web server 112 of the engine 104. In an exemplary embodiment of the present invention, the web server unit 110 operates as an Apache® or Nginx® server. The web server 112 is configured to authenticate the user upon receiving the inputs, by connecting to the authentication server 116. The authentication server 116 is configured to provide an authentication token to the user for accessing the GUI for providing inputs for application modernization solution determination. In an exemplary embodiment of the present invention, the authentication server unit 116 operates on OAuth® technique, thereby providing a multifactor authentication. The authentication server 116 is configured to communicate with the directory server 124 for authenticating the user. The directory server 124 stores and maintains personal data (e.g., names, age, gender, etc.) and identity data (e.g., photo, biometric data, etc.) of various users. In an exemplary embodiment of the present invention, the directory server 124 operates on a Lightweight Directory Access Protocol (LDAP).

In an embodiment of the present invention, the web server 112 is configured to render the dynamic GUI via the user device 110, which provides a dashboard for capturing the inputs for application modernization solution determination. The dashboard renders a search bar at the top of the GUI in which the inputs associated with application modernization solution determination are provided. The search bar rendered via the GUI is configured with cognitive search capabilities for automatically suggesting one or more similar results associated with inputs for application modernization solution determination in a dropdown manner based on a first set of rules. In an exemplary embodiment of the present invention, the cognitive search includes analyzing existing application modernization kits that comprise words and synonyms used in the search phrases based on the first set of rules. The first set of rules include, but are not limited to, analyzing and determining acronyms used for searching technology, tools, etc., provided in inputs (e.g., VB for "Visual Basics", SSMA for "SQL Server Migration Assistant"); analyzing by technology, tools, and titles; analyzing informal or colloquial phrases used for application modernization solution search (e.g., 'lift and shift' implies 'rehost'); and performing proximity search by ranking optimal technology combinations based on user requirements (e.g., if during onboarding, user's list of technology relate to Oracle®, Java®, or Linux®, then first set of rules rank search results with peripheral technologies matching the list of requirements). Therefore, appropriate inputs related to application modernization solution determination are captured via the GUI.

In an embodiment of the present invention, the inputs associated with the processed application modernization solution determination are transmitted from the web server 112 to the API server 118, which further analyzes the received inputs. In an exemplary embodiment of the present invention, the API server 118 operates at least as a Kestrel server or a Representational State Transfer Application Programming Interface (REST API). The API server 118 is configured to identify and analyze one or more parameters associated with the inputs received for application modernization solution determination based on a second set of rules. In an embodiment of the present invention, the second set of rules include, but are not limited to, processing search keywords into search parameters, assigning search parameters for the first set of rules, and applying ranking rules for result prioritization. In an embodiment of the present invention, the processing of search keywords into search parameters includes, but is not limited to, mapping key phrases related to application modernization, which are provided as input, against context (such as, mapping technology names, MAK titles, tool names after replacing synonyms and eliminating noise) and each of the key phrases is matched against the MAK descriptor keywords of respective category (such as, technology names, MAK titles and tool names). Further, assigning search parameters for the first set of rules include conditions such as if user is searching for one or more MAK documents using a technology title, then the match takes precedence, and if the technology title search does not match, then extended search to match is applied using technology, tool, and synonyms. Further, in the event the rendered MAK contains unwanted MAKs, then ranking rules are applied for result prioritization including, determining MAKs that match with the user's searched technology, providing standard MAKs first in the list of rendered MAKs, and prioritizing the MAKs containing technologies searched by the users. The API server 118 is configured to communicate with the directory server 124 for further authenticating the user details associated with the inputs. In an exemplary embodiment of the present invention, the API server 118 is configured to use a single LDAP authentication technique for authenticating the user details associated with the inputs.

In an embodiment of the present invention, the API server 118 is configured to communicate with the content server 122 for application modernization solution determination based on the identified and analyzed parameters associated with the inputs. In an exemplary embodiment of the present invention, the content server 122 operates on MySQL technique. In another exemplary embodiment of the present invention, the content server 122 is configured with at least pre-stored application modernization solutions, application modernization solution documents data, application modernization solutions image data, application modernization solutions video data, application modernization solution blueprints data, MAKs data, data related to previously used application modernization solution, etc., which are accumulated based on various empirical studies. In an embodiment of the present invention, the API server 118 is configured to send the analyzed parameters to the content server 122. The content server 122 is configured to select and fetch a relevant application modernization solution, stored therein, based on the received parameters by applying a pattern recognition technique.

In an embodiment of the present invention, the content server 122 in communication with the web content management server 120 sends the fetched application modernization solution to the proximity assessment unit 126. In an exemplary embodiment of the present invention, the web content management server 120 operates on Drupal® and may be deployed at least on Azure® or on-premises. The web content management server 120 is configured to manage transmission of data between various units of the engine 104 such as, the web server 112, the API server 118, the content server 122 and the proximity assessment unit 126.

In an embodiment of the present invention, the proximity assessment unit 126 is configured to assess proximity and similarity of the parameters with the fetched application modernization solution based on applying a nearest search technique. In another embodiment of the present invention, the proximity assessment unit 126 is further configured to assess technology composition equivalence between the received parameters and the fetched application modernization solution.

Figure 3B:
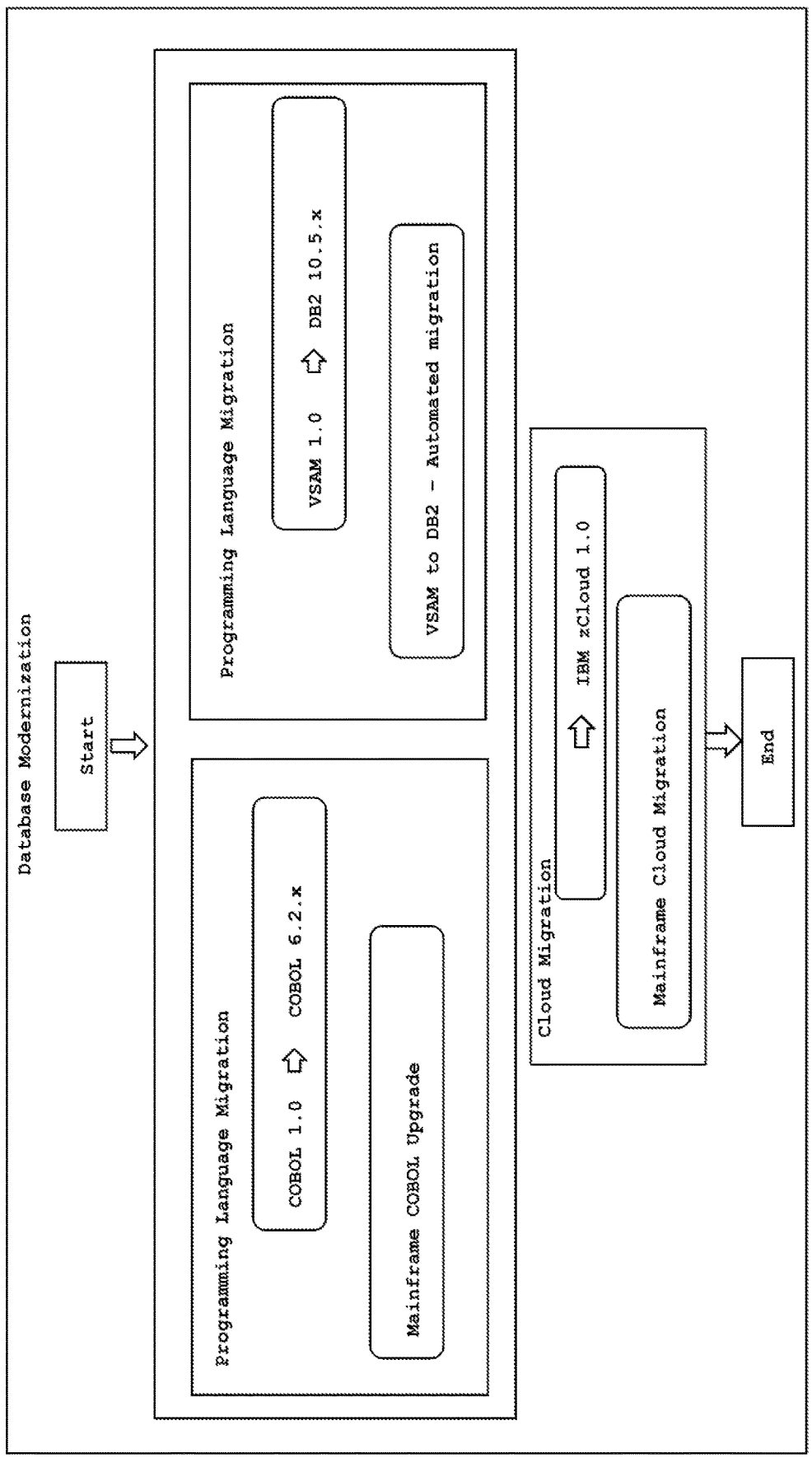
FIGS. 3B and 3D illustrate screenshots of a GUI depicting sequence of the assembled application modernization solution in a summary form, in accordance with an embodiment of the present invention.
Figure 3D:
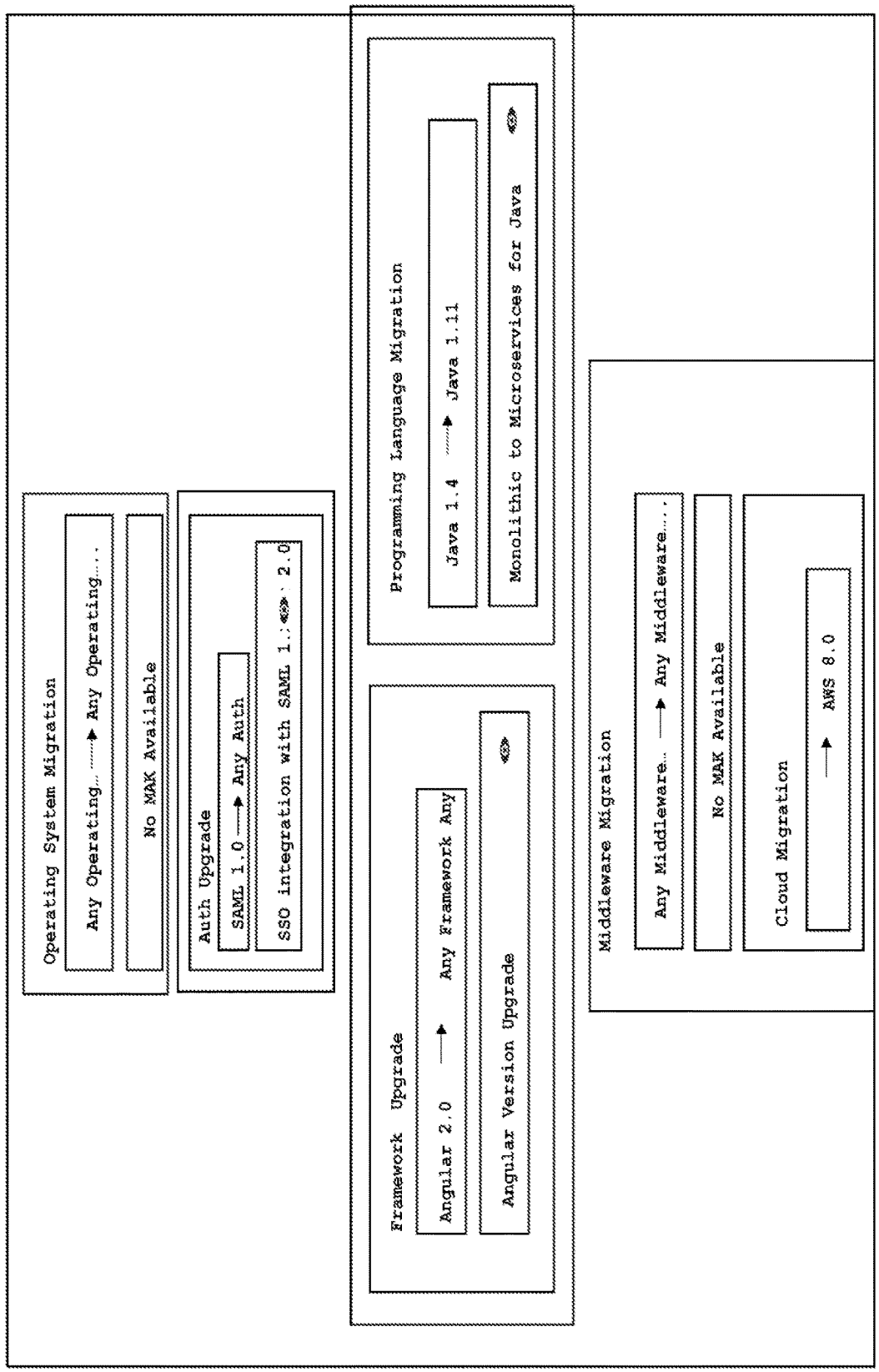
Figure 4B:
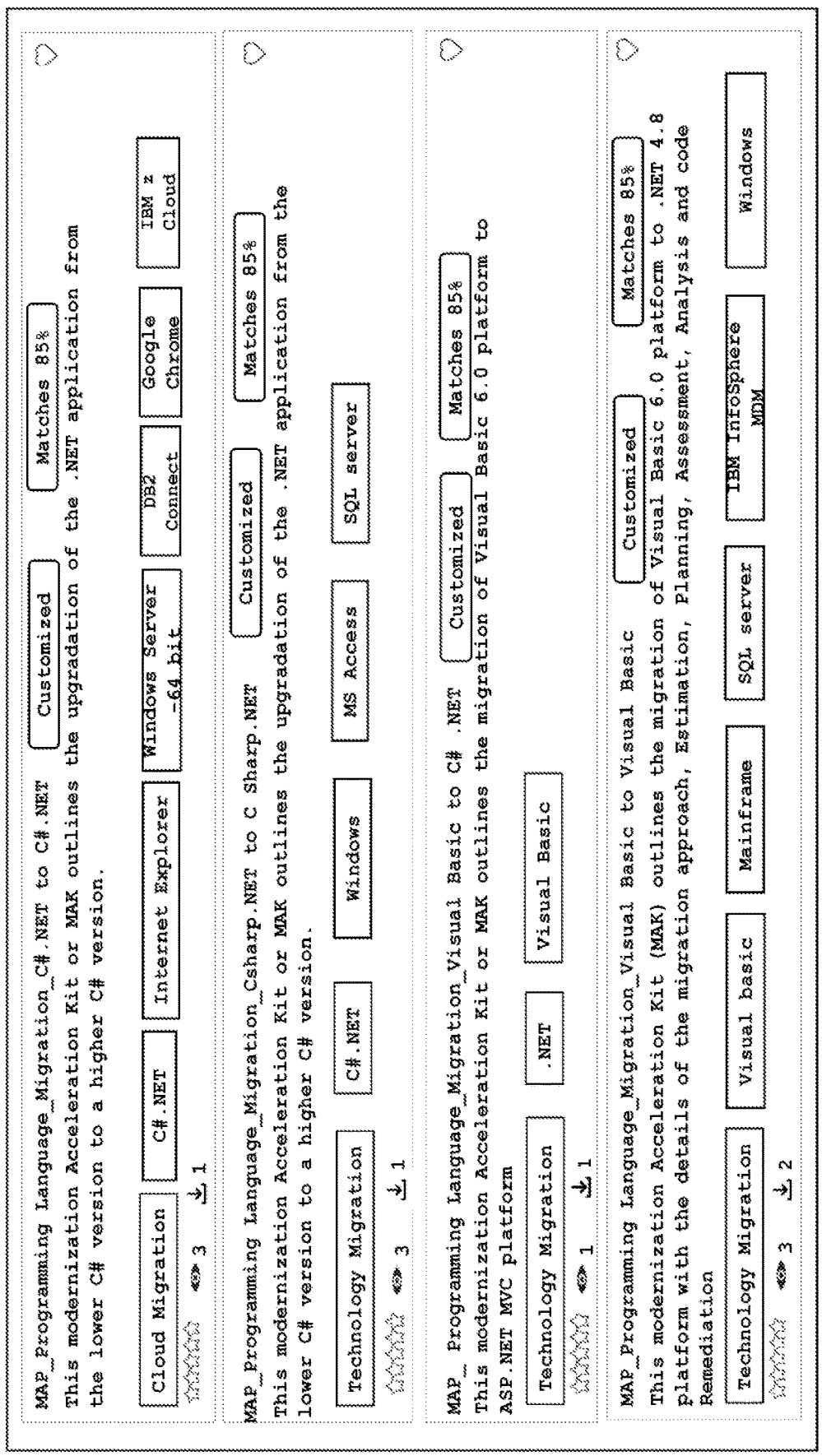
Figure 4C:
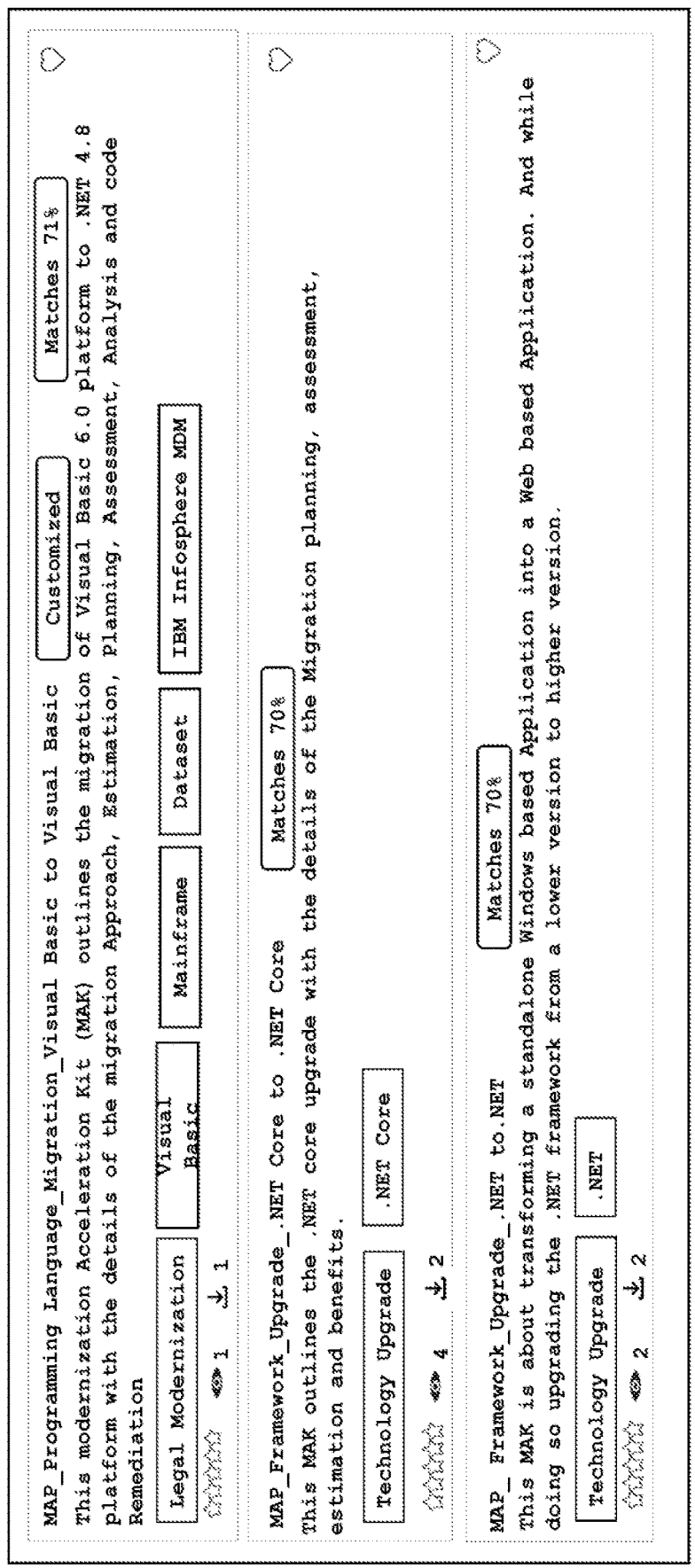

In an embodiment of the present invention, the solution assembling unit 114 is configured to receive the assessed application modernization solutions from the proximity assessment unit 126. The solution assembling unit 114 is configured to assemble the received application modernization solutions, using a third set of rules, for generating one or more catalogue application modernization solutions for rendering via the GUI at the user device 110, as illustrated in FIG. 3A and FIG. 3C. The assembled application modernization solution rendered via the GUI comprises sequence of steps, in a document form, for migrating the source technology to the target technology. In an exemplary embodiment of the present invention, the catalogue solutions are rendered along with a sequence of execution of the assembled application modernization solution in a summary form, as illustrated in FIG. 3B and FIG. 3D. In the event, the parameters are associated with the direct inputs, then the solution assembling unit 114 is configured to assemble the application modernization solution based on at least a contextual keyword match or an application modernization text match. The contextual keyword match is carried out based on extracting keywords from the parameters associated with the direct inputs, mapping keywords to the source technology name and the target technology name present in the parameters associated with the direct inputs, thereby collating the application modernization solutions based on a guided search. In another embodiment of the present invention, in the event, the parameters are associated with the indirect inputs, then the solution assembling unit 114 is configured to render a specific application modernization solution with application profile and technology via the GUI on the user device 110. In yet another embodiment of the present invention, in an event, if the specific application modernization solution is not available, then the solution assembling unit 114 is configured to render a default application modernization solution with application technology. Further, the solution assembling unit 114 is configured to render a MAK summary view associated with the MAK or application modernization solutions via the GUI.

In another embodiment of the present invention, the solution assembling unit 114 is configured to assemble the received application modernization solutions for carrying out a contextual sorting of the received application modernization solutions. The solution assembling unit 114 is configured to prioritize the assembled application modernization solutions for rendering via the GUI at the user device 110 end in order to contextually sort the received application modernization solutions. In an exemplary embodiment of the present invention, the prioritized solutions (in the form of MAK) rendered via the GUI provides the most effective solution (e.g., in-trend and latest solutions) at the top of the GUI and the least effective solution (e.g., solutions not in trend, expired solutions, etc.) at the bottom of the GUI, as illustrated in FIGS. 4A to 4D. In an embodiment of the present invention, the solution assembling unit 114 is configured to prioritize the assembled solutions based on one or more factors such as, but are not limited to, a match percentage of the parameters present in the inputs provided on the GUI and the stored application modernization solutions in the content server 122, standard MAK or Customized MAK, search technology relevant MAKs, primary technology of the application, alphabetical sorting based on MAK name, view count, download count, in-trend application modernization solutions and application modernization technology data. In an embodiment of the present invention, the solution assembling unit 114 is configured to perform a matching operation for determining a match percentage in a close neighborhood of the stored application modernization solutions.

In an exemplary solution embodiment of the present invention, the match percentage is computed based on the below mentioned logic:

$$\text{Match \%1} = \left[ \frac{\text{Count of matching words in search tag/}}{\text{count of words in } MAK \text{ title}} \right] * 100;$$

Match %2 = 15% (If search keyword contains $MAK$'s service Type) +

15% (If search keyword contains $MAK$'s service offering) +

40% (If search keyword contains $MAK$'s source) +

30% (If search keyword contains $MAK$'s target); and final match % for the $MAK$ = Maximum (Match %1, Match %2).

For example, match %1=4/7=57%; match %2=0%+15%+40%+30%=85%; and final match % for the MAK=Maximum (Match %1, Match %2)=85%. Further, the match percentages are periodically updated for match optimization, based on feedback.

Figure 5A:
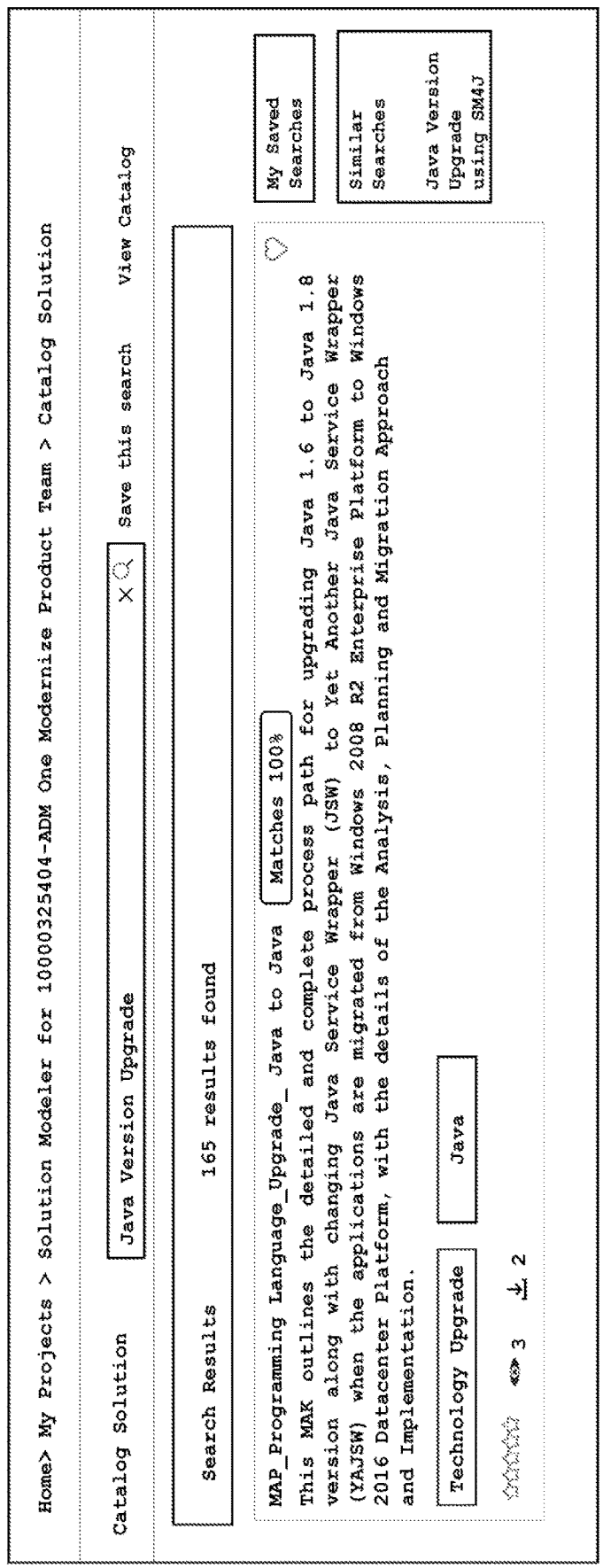
FIGS. 5A and 5B illustrate screenshots of the GUI depicting 100% match for the search results, if the title matches with a super Modernization Acceleration Kit (MAK) title, in accordance with an embodiment of the present invention.
Figure 5B:
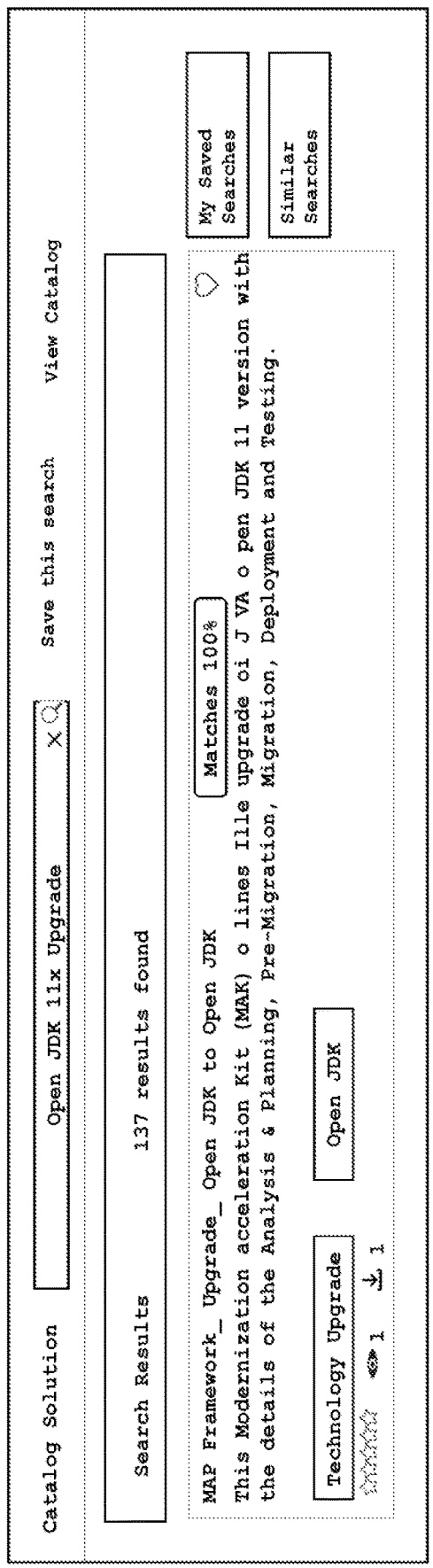
Figure 5C:
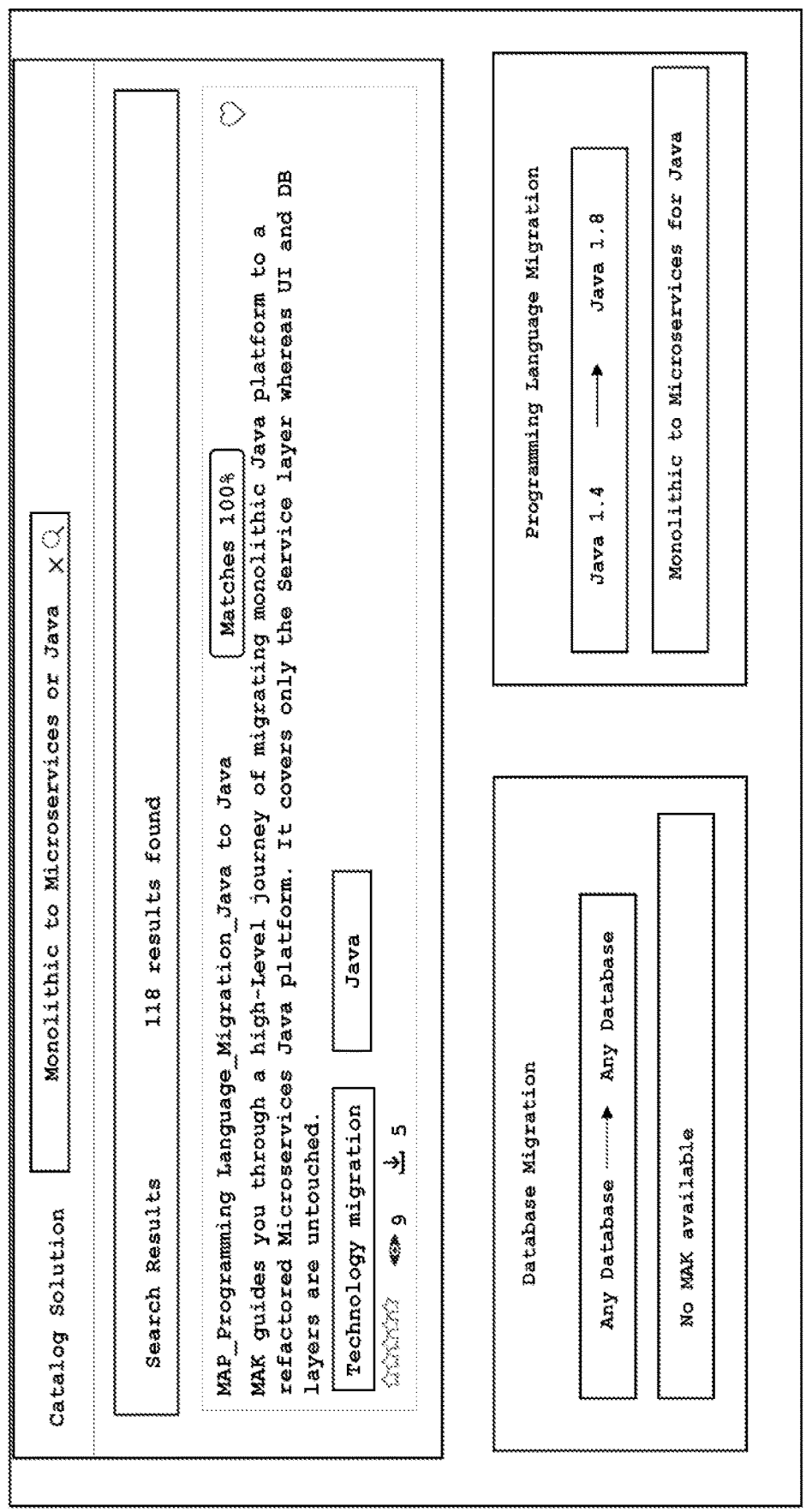
FIG. 5C illustrates a screenshot of the GUI depicting that if keywords in a direct input or an indirect input does not match with the super MAK title, then a micro-MAK title is checked and search results are displayed with the super MAKs that has the micro-MAK title as exact match via the UI, in accordance with an embodiment of the present invention.

In an embodiment of the present invention, the solution assembling unit 114 is configured to perform a check if the keywords in the direct input or the indirect input received via the GUI in the search bar exactly matches a super MAK title or not. In an exemplary embodiment of the present invention, in the event it is determined that the title matches with the super MAK title, then the search results are rendered as 100% match via the GUI, as illustrated in FIG. 5A and FIG. 5B. In another exemplary embodiment of the present invention, in the event it is determined that the keywords in the direct input or the indirect input do not match with the super MAK title, then the solution assembling unit 114 is configured to check a micro-MAK title and display the search results with the super MAKs that has the micro-MAK title as an exact 100% match via the GUI, as illustrated in FIG. 5C. In an embodiment of the present invention, the micro-MAK is an individual modernization kit, which provides application modernization solution for a single technology and the super MAK is a combination of two or more micro-MAKs, that are compatible with each other.

Figure 7:
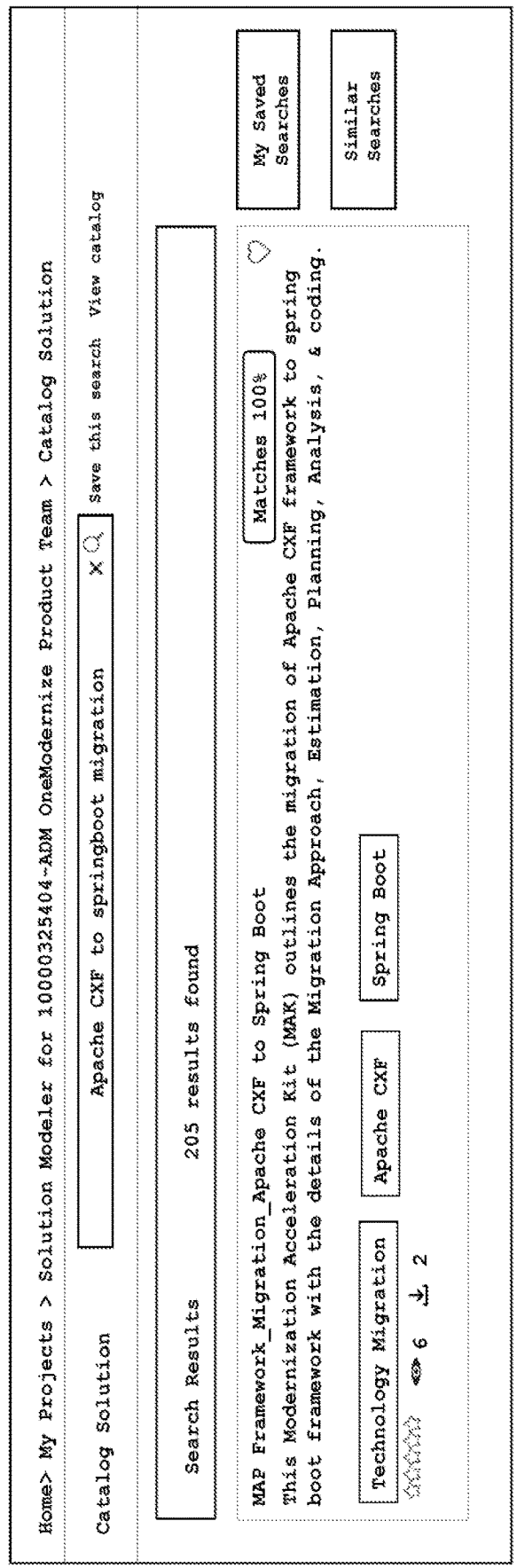

In an embodiment of the present invention, the solution assembling unit 114 is configured to render a recommended match percentage for the keywords present in the direct inputs and the indirect inputs in the catalog solution rendered via the GUI. For example, the direct or the indirect input including "mainframe application decommissioning" is provided with a match percentage of 70% for the displayed super MAK, as illustrated in FIGS. 6 and 7. In an embodiment of the present invention, a fourth set of pre-defined rules or a fifth set of pre-defined rules may be executed by the solution assembling unit 114 for rendering the recommended match percentage for the keywords present in the direct inputs and the indirect inputs. In an example, the fourth set of pre-defined rules is executed by checking whether the search tag is matching with the MAK title and counting of matching words in search tag/count of words in MAK title is MAK title*100=2/3*100=67%. In another example, the fifth set of pre-defined rules is executed in the manner as mentioned in table 1 below:

TABLE 1

| Service Type (15%) | 1 |
| Service Offering (15%) | 1 |
| Source (40%) | 1 |
| Target (30%) | N/A |
| Weightages | 70% |

In an embodiment of the present invention, the solution assembling unit 114 is further configured to render the catalogue solutions with a weak match percentage for the keywords present in the direct inputs and the indirect inputs, as illustrated in FIG. 8. For example, if a search for "MF Files Cloud Migration" is carried out for rendering the catalog solution and the super MAK for the searched keyword is not available or the keyword matches partially with the super MAK, then the partially matched results are rendered via the UI. Additionally, a notification suggesting for refine search and selecting guided search for better results along with a weak matching results notification is sent to the GUI on the user device 110 by the solution assembling unit 114.

In an embodiment of the present invention, the solution assembling unit 114 is configured to extract search tags from the keywords present in the direct inputs and the indirect inputs received via the GUI for efficiently assembling the application modernization solution. The direct input and the indirect input may represent a MAK title. The search tags may be associated with a MAK master or tables with MAK details. For example, in the event the keywords in the search associated with the direct inputs and the indirect inputs relate to 'mainframe application decommissioning', then the solution assembling unit 114 extracts search tags present in the keywords. The search tags associated with the MAK master or tables with MAK detail are validated. In an embodiment of the present invention, the solution assembling unit 114 is configured to process the keywords based on segregating the direct inputs or the indirect inputs as, search tag, count of matching words in search tag and total number of words in MAK title. For example, in the direct inputs or the indirect inputs relating to 'mainframe application decommissioning', the search tag is mainframe application; count of matching words in the search tag is 2; and total number of words in MAK title is 3.

Figure 9A:
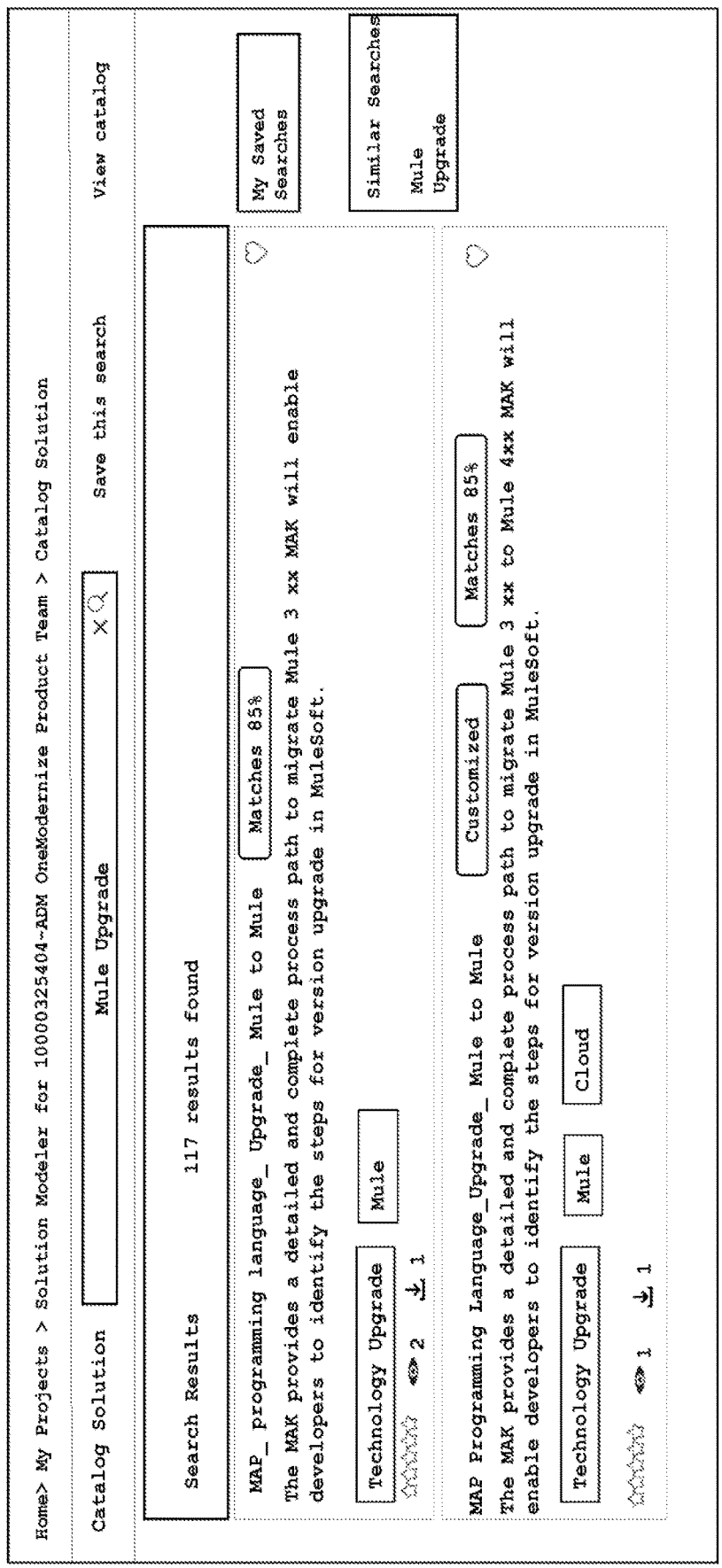
FIG. 9A illustrates a screenshot of the GUI depicting a customized MAK rendered as search result along with the super MAK as the catalog solution, in accordance with an embodiment of the present invention.
Figure 9C:
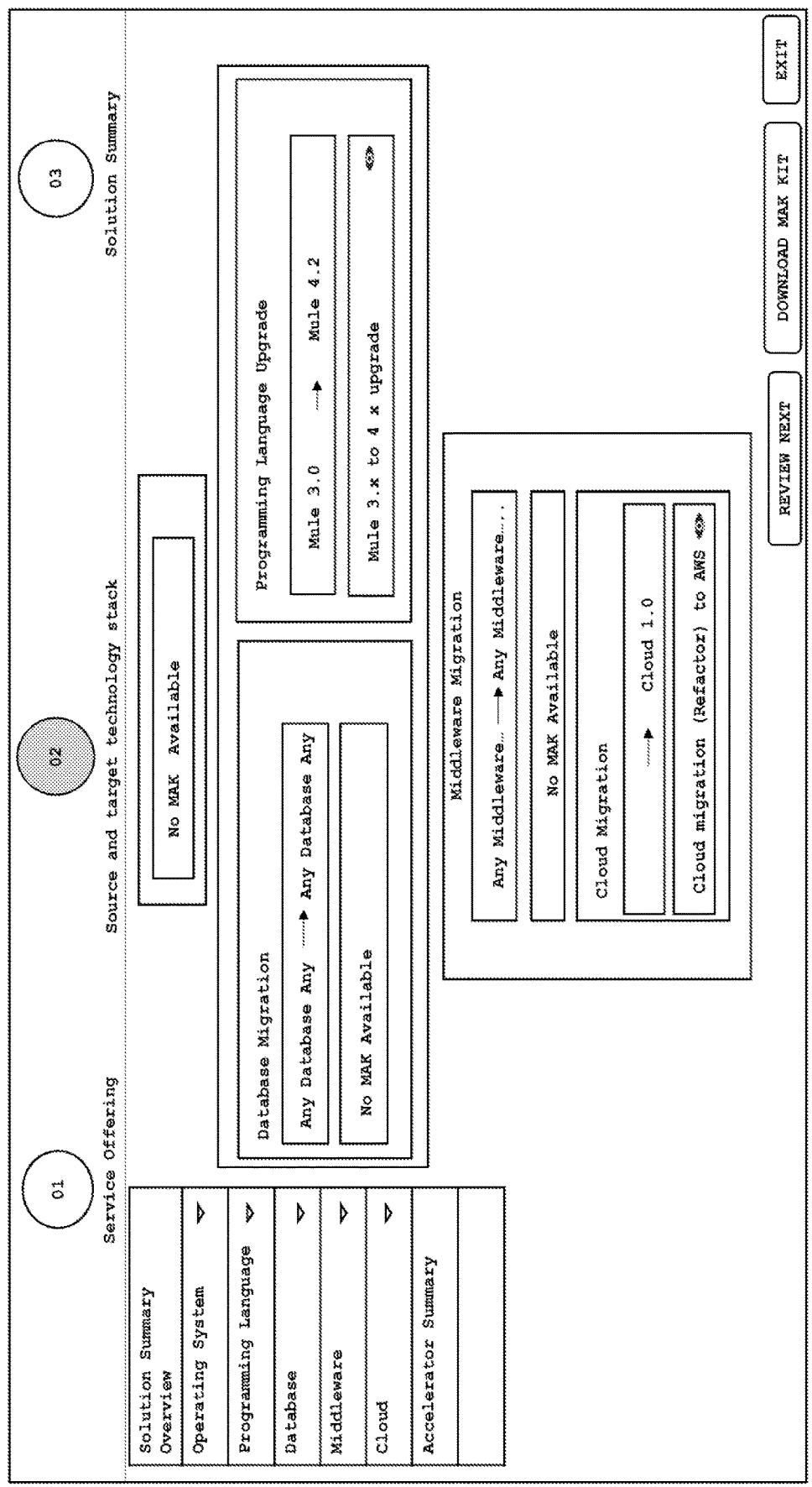
Figure 10:
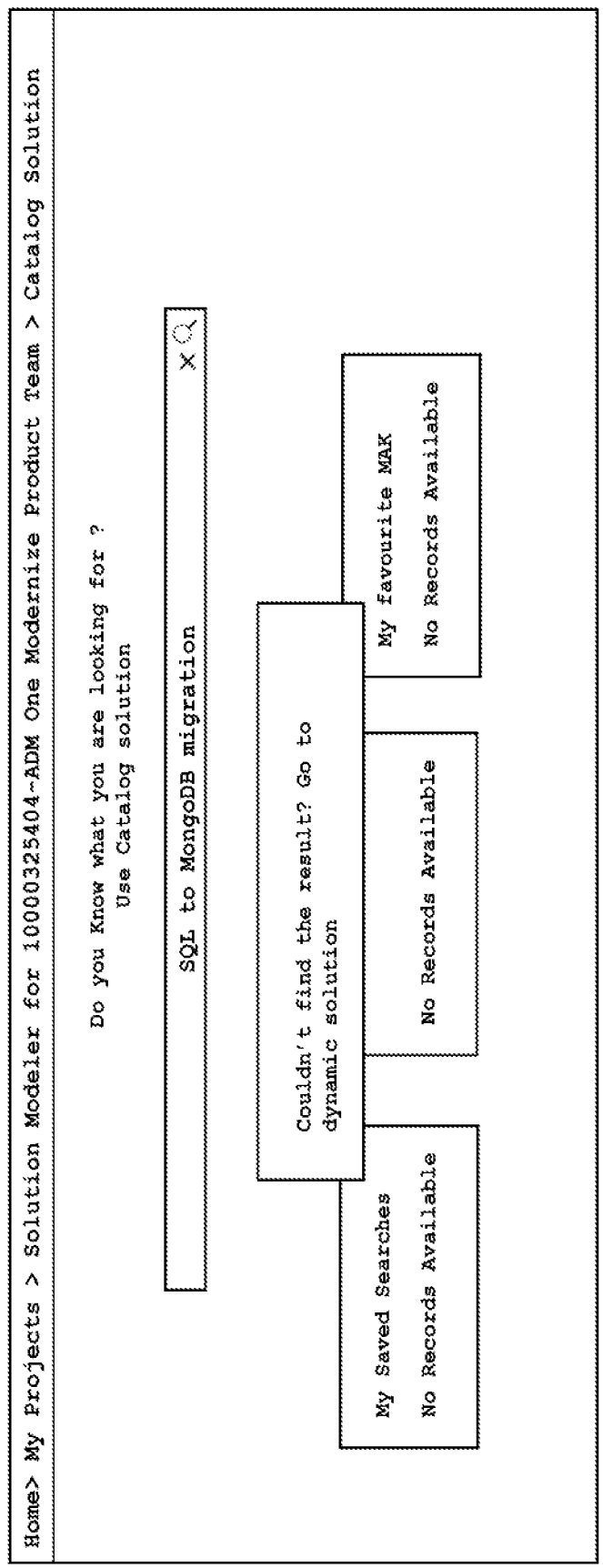
FIG. 10 illustrates a screenshot of the GUI depicting a pop-up dialogue box via the GUI, in an event no catalog solution is available for the searched keywords, in accordance with an embodiment of the present invention.

In an embodiment of the present invention, the solution assembling unit 114 is configured to render one or more assembled application modernization solutions as customized MAK via the UI at the user device 110 in the form of the catalog solutions. For example, if a search is carried out for "mule upgrade" for determining the associated catalog solution and if there is a customized MAK available, then the said customized MAK is rendered as search result along with the super MAK as the catalog solution, as illustrated in FIG. 9A. In another embodiment of the present invention, if the MAK is customized by completing all the steps including "downloading the MAK", then the solution assembling unit 114 renders the said MAK as a "customized MAK" in the search results as catalog solution, which is further mapped with a user ID in a user session table. In yet another exemplary embodiment of the present invention, the solution assembling unit 114 is configured to render the customized MAK for the guided search, as illustrated in FIGS. 9B and 9C. In an embodiment of the present invention, in the event no catalog solution is available for the searched keywords, then the solution assembling unit 114 is configured to render a pop-up dialogue box via the UI at the user device 110 providing a message as "could not find the results? go to dynamic solution", as illustrated in FIG. 10.

Figure 11:
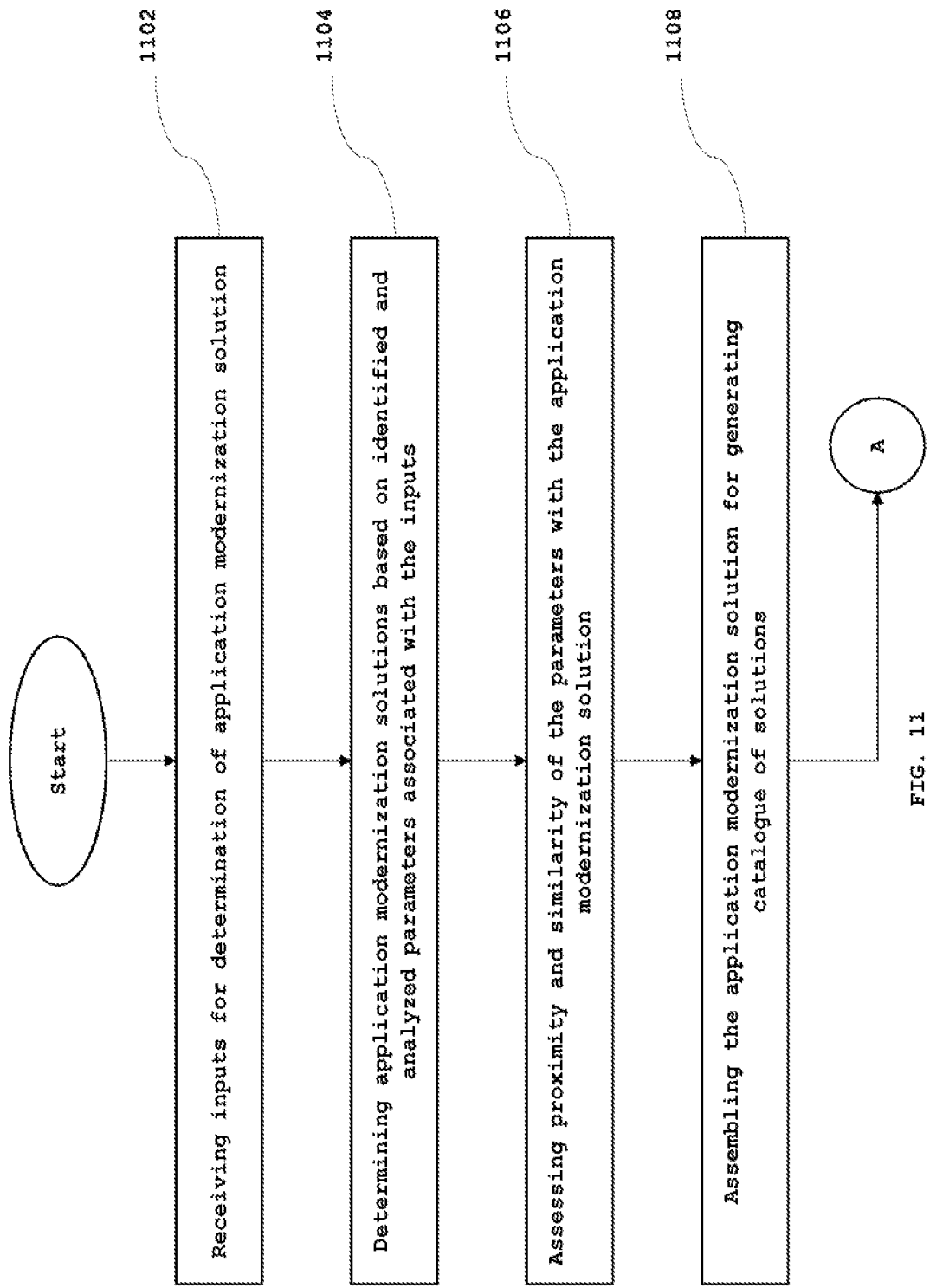
FIGS. 11 and 11A illustrate a flowchart depicting a method for optimally assembling solutions generated for modernization of applications, in accordance with an embodiment of the present invention.
Figure 11A:
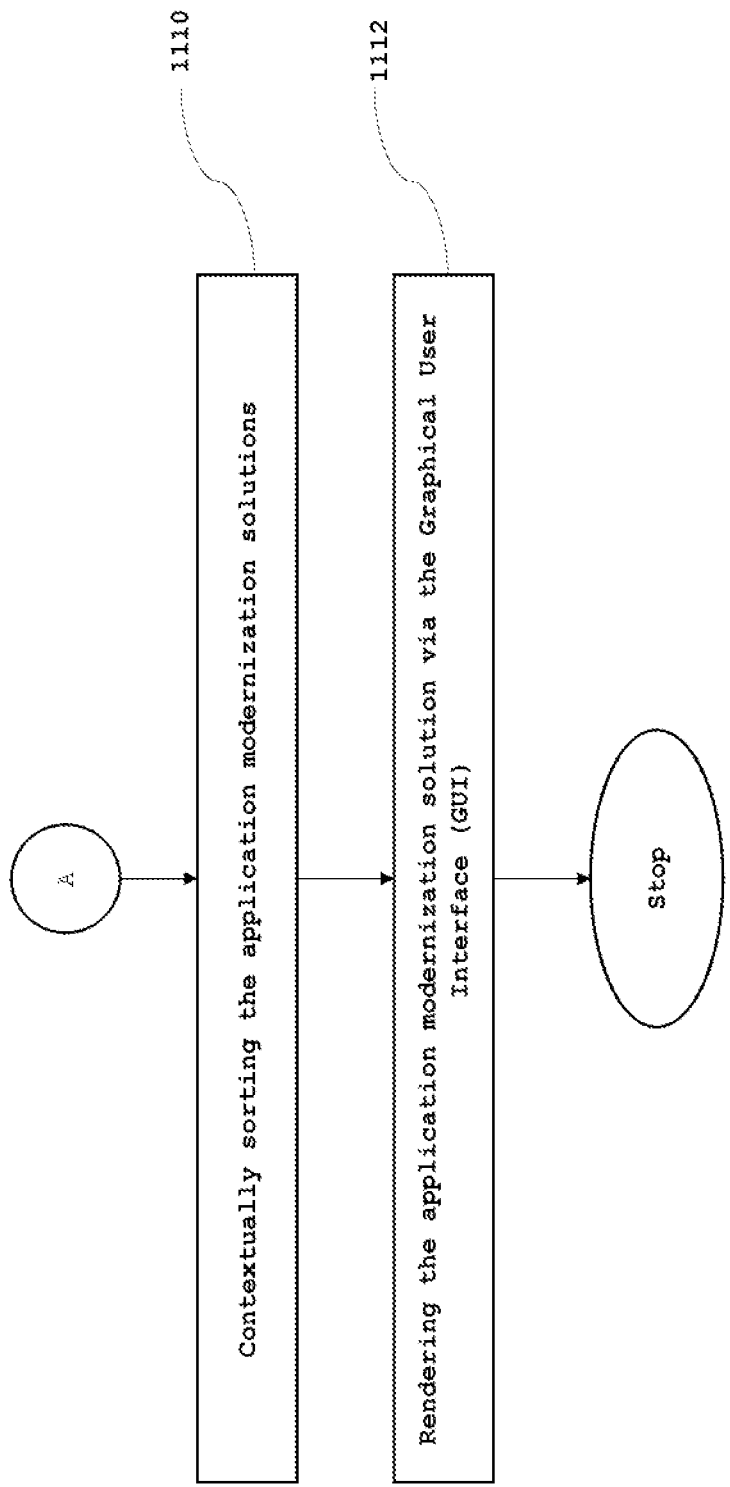

FIGS. 11 and 11A illustrate a flowchart depicting a method for optimally assembling solutions generated for modernization of applications, in accordance with various embodiments of the present invention.

At step 1102, inputs are received for determination of application modernization solution. In an embodiment of the present invention, the inputs are received for generation and determination of application modernization solution. The inputs are received via a dynamic GUI rendered on the user device 110. In an exemplary embodiment of the present invention, the inputs comprise direct inputs and indirect inputs. The direct inputs include inputs received by one or more users via the GUI. The indirect inputs include context-based inputs, which are automatically filled by contextual intelligence embedded in the GUI in the event appropriate inputs are not provided by the users. In an exemplary embodiment of the present invention, the application modernization solution determination relates to modernizing one or more existing technology types such as, but are not limited to, database (DB) modernization, programming language modernization, operating system (OS) modernization and middleware modernization. For example, database modernization may include modernizing or migrating from VSAM (a source technology name) to DB2 (a target technology name). Programming language modernization may include modernizing or migrating from Visual Basic 1.0® (the source technology name) to Java 1.11® (the target technology name). The inputs are associated with the parameters related to application modernization solution determination. In an exemplary embodiment of the present invention, the parameters may include, but are not limited to, names of technology type (source technology name and target technology name), application modernization solution description, tool names used in application modernization or solutions referring to tool names, synonyms relating to technology type names, keywords relating to application modernization solution, solution descriptors relating to application modernization, application modernization technology data, application modernization proximity influence data, equivalent solutions (e.g. application modernization composition required by users), latest application modernization solutions and name of pre-stored MAK associated with the previously modernized applications. In an exemplary embodiment of the present invention, the inputs provided are in the form of a query. In another exemplary embodiment of the present invention, the inputs are provided at least manually or using a chatbot provided on the GUI. The users are authenticated upon receiving the inputs.

In an embodiment of the present invention, the rendered dynamic GUI provides a dashboard for capturing the inputs for application modernization solution determination. The dashboard renders a search bar at the top of the GUI in which the inputs associated with application modernization solution determination are provided. The search bar rendered on the GUI is configured with cognitive search capabilities for automatically suggesting one or more similar results associated with inputs for application modernization solution determination in a dropdown manner based on a first set of rules. In an exemplary embodiment of the present invention, the cognitive search includes analyzing existing application modernization kits that comprise words and synonyms used in the search phrases based on the first set of rules. The first set of rules include, but are not limited to, analyzing and determining acronyms used for searching technology, tools, etc., provided in inputs (e.g., VB for "Visual Basics", SSMA for "SQL Server Migration Assistant"); analyzing by technology, tools, and titles; analyzing informal or colloquial phrases used for application modernization solution search (e.g., 'lift and shift' implies 'rehost'); and performing proximity search by ranking optimal combination based on user requirements (e.g., if during onboarding, user's list of technology requirement relate to Oracle®, Java®, or Linux®, then first set of rules rank search results with peripheral technologies matching the list of requirements). Therefore, appropriate inputs related to application modernization solution determination are captured via the GUI.

In an embodiment of the present invention, the inputs associated with the processed application modernization solution determination are further analyzed. The parameters associated with the inputs received for application modernization solution determination are identified and analyzed based on a second set of rules. In an embodiment of the present invention, the second set of rules include, but are not limited to, processing search keywords into search parameters, assigning search parameters for the first set of rules, applying ranking rules for result prioritization. In an embodiment of the present invention, the processing of search keywords into search parameters includes, but is not limited to, mapping key phrases related to application modernization, which are provided as input, against context (such as, mapping technology names, MAK titles, tool names after replacing synonyms and eliminating noise) and each of the key phrases is matched against the MAK descriptor keywords of respective category (such as, technology names, MAK titles and tool names). Further, assigning search parameters for the first set of rules include conditions such as if user is searching for one or more MAK documents using a technology title, then the match takes precedence, and if the technology title search does not match, then extended search is applied to match using technology, tool, and synonyms. Further, in the event the rendered MAK contains unwanted MAKs, then ranking rules are applied for result prioritization including, determining MAKs that match with the user's searched technology, providing standard MAKs first in the list of rendered MAKs, and prioritizing the MAKs containing technologies searched by the users.

At step 1104, application modernization solutions are determined based on identified and analyzed parameters associated with the inputs. In an embodiment of the present invention. In an embodiment of the present invention, the application modernization solutions are determined based on pre-stored application modernization solutions, application modernization solution documents data, application modernization solutions image data, application modernization solutions video data, application modernization solution blueprints data, MAKs data, data related to previously used application modernization solution, etc., which are accumulated based on various empirical studies. In an embodiment of the present invention, a relevant application modernization solution is selected and fetched from a content server based on the parameters by applying a pattern recognition technique.

At step 1106, proximity and similarity of the parameters is assessed with the application modernization solution. In an embodiment of the present invention, the proximity and similarity of the received parameters is assessed with the fetched application modernization solution by applying a nearest search technique. In another embodiment of the present invention, technology composition equivalence is assessed between the received parameters and the fetched application modernization solution.

At step 1108, the application modernization solution is assembled for generating catalogue of solutions. In an embodiment of the present invention, the received application modernization solutions are assembled, using a third set of rules, for generating one or more catalogue solutions for rendering via the GUI. The assembled application modernization solution rendered via the GUI comprises sequence of steps, in a document form, for migrating the source technology to the target technology. In an exemplary embodiment of the present invention, the catalogue solutions are rendered along with a sequence of the application modernization solution in a summary form. In the event, the parameters are associated with the direct inputs, then the application modernization solutions are assembled based on a contextual keyword match or an application modernization text match. The contextual keyword match is carried out by extracting keywords from the parameters associated with the direct inputs and mapping keywords to the source technology name and the target technology name present in the parameters associated with the direct inputs, thereby collating the application modernization solutions based on a guided search. In another embodiment of the present invention, in the event the parameters are associated with the indirect inputs, then a specific application modernization solution is rendered with application profile and technology via the GUI. In yet another embodiment of the present invention, in the event specific application modernization solution is not available, then a default application modernization solution is rendered with application technology. Further, a MAK summary view associated with the MAK or application modernization solutions is also rendered via the GUI.

At step 1110, the application modernization solutions are contextually sorted. In an embodiment of the present invention, the application modernization solutions are assembled for carrying out a contextual sorting of the received application modernization solutions. The assembled application modernization solutions are prioritized for rendering via the GUI in order to contextually sort the received application modernization solutions. The prioritized solutions (in the form of MAK) rendered via the GUI provides the most effective solution (e.g., in-trend and latest solutions) at the top of the GUI and the least effective solution (e.g., solutions not in trend, expired solutions, etc.) at the bottom of the GUI. In an embodiment of the present invention, the assembled solutions are prioritized based on one or more factors such as, but are not limited to, a match percentage of the parameters present in the inputs received via the GUI and the stored application modernization solutions in the content server, standard MAK or customized MAK, search technology relevant MAKs, primary technology of the application, alphabetical sorting based on MAK name, view count, download count, in-trend application modernization solutions and application modernization technology data. In an embodiment of the present invention, a matching operation is performed for determining match percentage in a close neighborhood of the stored application modernization solutions.

In an embodiment of the present invention, a check is performed if the keywords in the direct input or the indirect input received via the GUI in the search bar exactly matches a super MAK title or not. In an exemplary embodiment of the present invention, in the event it is determined that the title matches with the super MAK title, then the search results are rendered as a 100% match via the GUI. In another exemplary embodiment of the present invention, in the event it is determined that the keywords in the direct input or the indirect input do not match with the super MAK title, then a micro-MAK title is checked and the search results with the super MAKs are displayed that has the micro-MAK title as an exact 100% match via the GUI. In an embodiment of the present invention, the micro-MAK is an individual modernization kit, which provides application modernization solution for a single technology and the super MAK is a combination of two or more micro-MAKs, that are compatible with each other.

In an embodiment of the present invention, a recommended match percentage is rendered for the keywords present in the direct inputs and the indirect inputs in the catalog solution rendered via the GUI. For example, if the direct or the indirect input includes "mainframe application decommissioning", then the match percentage is provided as 70% for the displayed super MAK. In an exemplary embodiment of the present invention, a fourth set of rules or a fifth set of pre-defined rules may be executed for rendering the recommended match percentage for the keywords present in the direct inputs and the indirect inputs respectively. The fourth set of rules is executed by checking whether the search tag is matching with the MAK title and counting of matching words in search tag/count of words in MAK title is MAK title*100=2/3*100=67%. The fifth set of pre-defined rules is executed in the manner as mentioned in table 1.

In an embodiment of the present invention, the catalogue solutions are rendered with a weak match percentage for the keywords present in the direct inputs and the indirect inputs. For example, if a search for "MF Files Cloud Migration" is carried out for rendering the catalog solution and the super MAK for the searched keyword is not available or the keyword matches partially with the super MAK, then the partially matched results are rendered via the UI. A notification suggesting for refine search and selecting a guided search for better results along with a weak matching results notification is sent to the GUI.

In an embodiment of the present invention, search tags are extracted from the keywords present in the direct inputs and the indirect inputs received via the GUI for efficiently assembling the application modernization solution. In an exemplary embodiment of the present invention, the direct input and the indirect input may represent a MAK title. In another exemplary embodiment of the present invention, the search tags may be associated with a MAK master or tables with MAK detail. For example, in the event the keywords in the search associated with the direct inputs and the indirect inputs relate to 'mainframe application decommissioning', then search tags present in the keywords are extracted. The search tags associated with the MAK master or the tables with MAK detail are validated. In an exemplary embodiment of the present invention, the keywords are processed by segregating the direct inputs or the indirect inputs as, search tag, count of matching words in search tag and total number of words in MAK title. For example, in the direct inputs or the indirect inputs relating to 'mainframe application decommissioning', the search tag is mainframe application; count of matching words in the search tag is 2; and total number of words in MAK title is 3.

At step 1112, the application modernization solutions are rendered via the GUI. In an embodiment of the present invention, the one or more assembled application modernization solutions are rendered as customized MAK via the UI in the form of catalog solutions. For example, if a search is carried out for "mule upgrade" for determining the associated catalog solution and if there is a customized MAK available, then the said customized MAK is rendered as a search result along with the super MAK as the catalog solution. In another embodiment of the present invention, if the MAK is customized by completing all the steps including "downloading the MAK", then the MAK is rendered as a "customized MAK" in the search results as a catalog solution, which is further mapped with a user ID in a user session table. In an exemplary embodiment of the present invention, the customized MAK is rendered for the guided search. In an embodiment of the present invention, in the event no catalog solution is available for the searched keywords, then a pop-up dialogue box is rendered via the UI providing a message as "could not find the results? go to dynamic solution".

Advantageously, in accordance with various embodiments of the present invention, an efficient system, and a method for optimally assembling solutions generated and determined for modernization of applications is provided. The present invention provides for an accumulated and unified view of the generated application modernization solutions by rendering unique combinations of all assembled application modernization solutions along with solution summaries that have been previously used. There is no dependency on the SME for assembling application modernization solutions, thereby increasing accuracy. The present invention effectively caters to user requirements. The present invention provides latest, updated and in-trend assembled application modernization solutions. Further, the present invention provides for reducing time and effort while rendering a wide range and multiple combinations of assembled application modernization solutions as required by the user.

Figure 12:
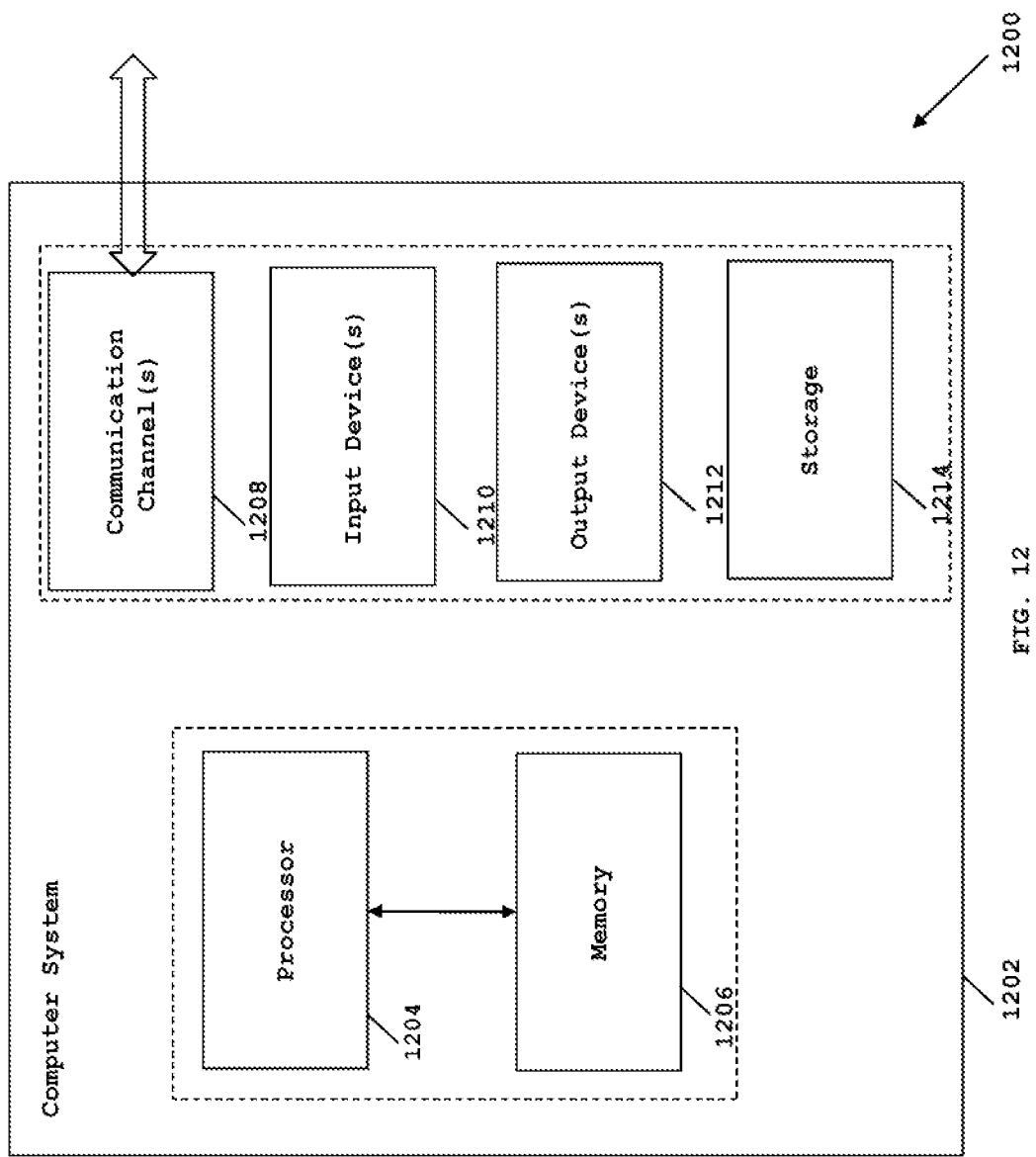
FIG. 12 illustrates an exemplary computer system in which various embodiments of the present invention may be implemented.

FIG. 12 illustrates an exemplary computer system in which various embodiments of the present invention may be implemented. The computer system 1202 comprises a processor 1204 and a memory 1206. The processor 1204 executes program instructions and is a real processor. The computer system 1202 is not intended to suggest any limitation as to scope of use or functionality of described embodiments. For example, the computer system 1202 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 1206 may store software for implementing various embodiments of the present invention. The computer system 1202 may have additional components. For example, the computer system 1202 includes one or more communication channels 1208, one or more input devices 1210, one or more output devices 1212, and storage 1214. An interconnection mechanism (not shown) such as a bus, controller, or network, interconnects the components of the computer system 1202. In various embodiments of the present invention, operating system software (not shown) provides an operating environment for various softwares executing in the computer system 1202 and manages different functionalities of the components of the computer system 1202.

The communication channel(s) 1208 allows communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth, or other transmission media.

The input device(s) 1210 may include, but not limited to, a keyboard, mouse, pen, joystick, trackball, a voice device, a scanning device, touch screen or any another device that is capable of providing input to the computer system 1202. In an embodiment of the present invention, the input device(s) 1210 may be a sound card or similar device that accepts audio input in analog or digital form. The output device(s) 1212 may include, but not limited to, a user interface on CRT or LCD, printer, speaker, CD/DVD writer, or any other device that provides output from the computer system 1202.

The storage 1214 may include, but not limited to, magnetic disks, magnetic tapes, CD-ROMs, CD-RWs, DVDs, flash drives or any other medium which can be used to store information and can be accessed by the computer system 1202. In various embodiments of the present invention, the storage 1214 contains program instructions for implementing the described embodiments.

The present invention may suitably be embodied as a computer program product for use with the computer system 1202. The method described herein is typically implemented as a computer program product, comprising a set of program instructions which are executed by the computer system 1202 or any other similar device. The set of program instructions may be a series of computer readable codes stored on a tangible medium, such as a computer readable storage medium (storage 1214), for example, diskette, CD-ROM, ROM, flash drives or hard disk, or transmittable to the computer system 1202, via a modem or other interface device, over either a tangible medium, including but not limited to optical or analogue communications channel(s) 1208. The implementation of the invention as a computer program product may be in an intangible form using wireless techniques, including but not limited to microwave, infrared, Bluetooth, or other transmission techniques. These instructions can be preloaded into a system or recorded on a storage medium such as a CD-ROM or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the scope of the invention.

We claim:

1. A system for optimally assembling application modernization solutions, the system comprising:
   a memory storing program instructions;
   a processor configured to execute instructions stored in the memory; and
   a solution assembling engine executed by the processor and configured to:
      receive one or more direct inputs or indirect inputs relating to application modernization solution determination as a query to identify and analyze one or more parameters associated with the inputs;
      determine application modernization solutions based on the analyzed parameters by applying a pattern recognition technique;
      assess proximity and similarity of the parameters with the determined application modernization solutions by applying a nearest search technique, wherein a technology composition equivalence is assessed between the parameters and the determined application modernization solutions; and
      assemble the application modernization solutions for generating one or more catalogue application modernization solutions.

2. The system as claimed in claim 1, wherein the direct inputs include inputs received from users via a Graphical User Interface (GUI), and wherein the indirect inputs include context-based inputs which are automatically filled by contextual intelligence embedded in the GUI, in the event direct inputs are not provided by the users.

3. The system (100 as claimed in claim 1, wherein the parameters comprise names of technology type including a source technology name and a target technology name, application modernization solution description, tool names used in application modernization or solutions referring to tool names, synonyms relating to technology type names, keywords relating to application modernization solution, solution descriptors relating to application modernization, application modernization technology data, application modernization proximity influence data, equivalent solutions, latest application modernization solutions and name of pre-stored Modernization Acceleration Kit (MAK) associated with the previously modernized applications.

4. The system as claimed in claim 1, wherein the solution assembling engine comprises a web server executed by the processor and configured to render a dynamic GUI via a user device, which provides a dashboard for capturing the inputs for application modernization solution determination, and wherein the dashboard renders a search bar at the top of the GUI in which the inputs associated with application modernization solution determination are provided.

5. The system as claimed in claim 4, wherein the search bar rendered via the GUI is configured with cognitive search capabilities for automatically suggesting one or more similar results associated with the inputs for application modernization solution determination based on a first set of rules, and wherein the cognitive search includes analyzing existing application modernization kits that comprise words and synonyms used in the search based on the first set of rules, and wherein the first set of rules include analyzing and determining acronyms used for searching technology and tools, analyzing by technology, tools, and titles, analyzing informal or colloquial phrases used for application modernization solution search, and performing proximity search by ranking optimal technology combination based on user requirements.

6. The system as claimed in claim 1, wherein the parameters are identified and analyzed based on a second set of rules, the second set of rules comprising processing search keywords into search parameters, assigning search parameters for the first set of rules, and applying ranking rules for result prioritization.

7. The system as claimed in claim 6, wherein the processing of search keywords into search parameters comprises mapping key phrases against Modernization Acceleration Kit (MAK) descriptor keywords of categories including technology names, MAK titles and tool names, and wherein assigning search parameters for the first set of rules comprises conditions such as if user is searching for one or more MAK documents using a technology title, then the match takes precedence, and if the technology title search does not match, then extended search to match using technology, tool, and synonyms is applied, and wherein in an event the rendered MAK contains unwanted MAKs, then ranking rules are applied for result prioritization including determining MAKs which match with the user's searched technology, providing standard MAKs first in the list of rendered MAKs, and prioritizing the MAKs containing technologies searched by the users.

8. The system as claimed in claim 1, wherein the solution assembling engine comprises an Application Programming Interface (API) server executed by the processor and configured to communicate with a content server for application modernization solution determination based on the analyzed parameters associated with the inputs.

9. The system as claimed in claim 8, wherein the content server is configured with pre-stored application modernization solutions, application modernization solution documents data, application modernization solutions image data, application modernization solutions video data, application modernization solution blueprints data, MAKs data, data related to previously used application modernization solution, which are accumulated based on various empirical studies.

10. The system as claimed in claim 1, wherein the assembled application modernization solution rendered via a GUI comprises sequence of steps, in a document form, for migrating a source technology to a target technology.

11. The system as claimed in claim 4, wherein in the event, the parameters are associated with the direct inputs, then a solution assembling unit in the solution assembling engine is configured to assemble the application modernization solutions based on a contextual keyword match or an application modernization text match, and wherein the contextual keyword match is carried out based on extracting keywords from the parameters, mapping keywords to a source technology name and a target technology name, and collating the application modernization solutions based on a guided search.

12. The system as claimed in claim 11, wherein the solution assembling unit is configured to assemble the received application modernization solutions for carrying out a contextual sorting of the received application modernization solutions.

13. The system as claimed in claim 11, wherein in the event, the parameters are associated with the indirect inputs, then the solution assembling unit is configured to render a specific application modernization solution with application profile and technology via a GUI on a user device.

14. The system as claimed in claim 13, wherein in the event it is determined that the specific application modernization solution is not available, then the solution assembling unit is configured to render a default application modernization solution with application technology, and wherein the solution assembling unit is configured to prioritize the assembled application modernization solutions for rendering via the GUI at the user device in order to contextually sort the received application modernization solutions.

15. The system as claimed in claim 11, wherein the solution assembling unit is configured to prioritize the assembled application modernization solutions based on one or more factors comprising a match percentage of the parameters present in the inputs provided via a GUI and stored application modernization solutions in a content server, standard MAK or Customized MAK, search technology relevant MAKs, primary technology of the application, alphabetical sorting based on MAK name, view count, download count, in-trend application modernization solutions and application modernization technology data.

16. The system as claimed in claim 15, wherein the solution assembling unit is configured to perform a matching operation for determining a match percentage in a close neighborhood of the stored application modernization solutions.

17. The system as claimed in claim 11, wherein the solution assembling unit is configured to perform a check to determine if keywords in the direct input or the indirect input in the search bar exactly matches a super MAK title or not, and wherein in the event it is determined that the title matches with a super MAK title, then a search results are rendered as 100% match via the GUI, and wherein in the event it is determined that the keywords in the direct input or the indirect input do not match with the super MAK title, then the solution assembling unit is configured to check a micro-MAK title and display the search results with the super MAKs that have the micro-MAK title as an exact 100% match via the GUI.

18. The system as claimed in claim 17, wherein the solution assembling unit executes a fourth set of pre-defined rules or a fifth set of pre-defined rules for rendering a recommended match percentage for the keywords present in the direct inputs and the indirect inputs.

19. The system as claimed in claim 17, wherein the solution assembling unit is configured to extract search tags from the keywords present in the direct inputs and the indirect inputs received via the GUI for assembling the application modernization solutions, and wherein the solution assembling unit is configured to process the keywords based on segregating the direct inputs or the indirect inputs as, search tag, count of matching words in search tag and total number of words in MAK title.

20. The system as claimed in claim 11, wherein the solution assembling unit is configured to render the assembled application modernization solutions as a customized MAK via the UI on the user device in the form of catalog application modernization solutions if it is determined that the MAK is customized by completing all the steps including downloading the MAK, the customized MAK is mapped with a user ID in a user session table.

21. A method for optimally assembling application modernization solutions, wherein the method is implemented by a processor executing program instructions stored in a memory, the method comprises:
   receiving one or more direct inputs or one or more indirect inputs relating to application modernization solution determination as a query to identify and analyze one or more parameters associated with the inputs;
   determining application modernization solutions based on the analyzed parameters by applying a pattern recognition technique;
   assessing proximity and similarity of the parameters with the determined application modernization solution by applying a nearest search technique, wherein a technology composition equivalence is assessed between the parameters and the determined application modernization solutions; and
   assembling the application modernization solutions for generating one or more catalogue application modernization solutions.

22. The method as claimed in claim 21, wherein a search bar is rendered via a GUI with cognitive search capabilities for automatically suggesting one or more similar results associated with the inputs for application modernization solution determination based on a first set of rules, and wherein the cognitive search includes analyzing existing application modernization kits that comprise words and synonyms used in the search based on the first set of rules, and wherein the first set of rules include analyzing and determining acronyms used for searching technology and tools, analyzing by technology, tools, and titles, analyzing informal or colloquial phrases used for application modernization solution search, and performing proximity search by ranking optimal technology combination based on user requirements.

23. The method as claimed in claim 21, wherein the assembled application modernization solutions rendered via a GUI comprises a sequence of steps of execution of the assembled application modernization solutions, in a document form, for migrating a source technology to a target technology.

24. The method as claimed in claim 21, wherein in the event it is determined that the parameters are associated with the direct inputs, then the application modernization solutions are assembled based on at least a contextual keyword match or an application modernization text match, and wherein the contextual keyword match is carried out based on extracting keywords from the parameters, mapping keywords to a source technology name and a target technology name, and collating the application modernization solutions based on a guided search.

25. The method as claimed in claim 24, wherein in the event, the parameters are associated with the indirect inputs, then a specific application modernization solution is rendered with application profile and technology via a GUI.

26. The method as claimed in claim 24, wherein in the event it is determined that the specific application modernization solution is not available, then a default application modernization solution is rendered with application technology, and wherein the assembled application modernization solutions are prioritized for rendering via a GUI in order to contextually sort the received application modernization solutions.

27. The method as claimed in claim 26, wherein the assembled application modernization solutions are prioritized based on one or more factors comprising a match percentage of the parameters present in the inputs provided via the GUI and stored application modernization solutions in a content server (122), standard MAK or Customized MAK, search technology relevant MAKs, primary technology of the application, alphabetical sorting based on MAK name, view count, download count, in-trend application modernization solutions and application modernization technology data.

28. The method as claimed in claim 27, wherein a matching operation is performed for determining a match percentage in a close neighborhood of the stored application modernization solutions.

29. The method as claimed in claim 22, wherein a check is performed to determine if keywords in the direct input or the indirect input in the search bar exactly matches a super MAK title or not, and wherein in the event it is determined that the title matches with the super MAK title, then search results are rendered as 100% match via the GUI, and wherein in the event it is determined that the keywords in the direct input or the indirect input do not match with the super MAK title, then a micro-MAK title is checked and search results are displayed with the super MAKs that have the micro-MAK title as an exact 100% match via the GUI.

30. The method as claimed in claim 29, wherein a fourth set of pre-defined rules or a fifth set of pre-defined rules are executed for rendering a recommended match percentage for the keywords present in the direct inputs and the indirect inputs.

31. The method as claimed in claim 29, wherein search tags are extracted from the keywords present in the direct inputs and the indirect inputs for efficiently assembling the application modernization solution, and wherein the keywords are processed based on segregating the direct inputs or the indirect inputs as, search tag, count of matching words in search tag and total number of words in MAK title.

32. The method as claimed in claim 21, wherein the assembled application modernization solutions are rendered as a customized MAK via the UI in the form of the catalog application modernization solutions if it is determined that the MAK is customized by completing all the steps including downloading the MAK, the customized MAK is mapped with a user ID in a user session table.

33. A computer program product comprising:
a non-transitory computer-readable medium having computer program code stored thereon, the computer-readable program code comprising instructions that, when executed by a processor, causes the processor to:
receive one or more direct inputs or one or more indirect inputs relating to application modernization solution determination as a query to identify and analyze one or more parameters associated with the inputs;
determine application modernization solutions based on the analyzed parameters by applying a pattern recognition technique;
assess proximity and similarity of the parameters with the determined application modernization solutions by applying a nearest search technique, wherein a technology composition equivalence is assessed between the parameters and the determined application modernization solutions; and
assemble the application modernization solutions for generating one or more catalogue application modernization solutions.

* * * * *